(12) United States Patent
Ahn

(10) Patent No.: US 12,531,032 B2
(45) Date of Patent: Jan. 20, 2026

(54) GATE DRIVER AND DISPLAY APPARATUS INCLUDING THE SAME

(71) Applicant: LG Display Co., Ltd., Seoul (KR)

(72) Inventor: Soonsung Ahn, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/018,969

(22) Filed: Jan. 13, 2025

(65) Prior Publication Data

US 2025/0279062 A1 Sep. 4, 2025

(30) Foreign Application Priority Data

Feb. 29, 2024 (KR) .................. 10-2024-0029727

(51) Int. Cl.
*G09G 3/3266* (2016.01)
(52) U.S. Cl.
CPC ... *G09G 3/3266* (2013.01); *G09G 2320/0252* (2013.01); *G09G 2330/021* (2013.01)
(58) Field of Classification Search
CPC ......... G09G 3/3266; G09G 2320/0252; G09G 2330/021
USPC ....................................... 345/204
See application file for complete search history.

(56) References Cited

U.S. PATENT DOCUMENTS

| 10,319,283 | B2 | 6/2019 | Kim et al. |
| 2017/0169757 | A1 | 6/2017 | Kim et al. |
| 2023/0206853 | A1* | 6/2023 | Kim ................. G09G 3/3266 345/204 |

FOREIGN PATENT DOCUMENTS

KR 10-2487109 B1 1/2023

* cited by examiner

*Primary Examiner* — Abdul-Samad A Adediran
(74) *Attorney, Agent, or Firm* — Fenwick & West LLP

(57) ABSTRACT

A gate driver may include a plurality of stages, each of the plurality of stages includes: a node controller configured to control voltages of a Q node, a Q2 node, a Qb node, and a QN node connected to transistors based on a first clock signal and a second clock signal; a dummy signal output unit configured to output a dummy signal based on the voltages of the Q node and the Qb node; and a scan signal output unit configured to output a scan signal to a scan line based on the voltages of the Q node and the QN node, and a transistor configured to output a gate low voltage according to a voltage of the Q node as the scan signal, among a configuration of the scan signal output unit, may be a P-type transistor.

14 Claims, 15 Drawing Sheets

GATE DRIVER AND DISPLAY APPARATUS INCLUDING THE SAME

CROSS-REFERENCE TO RELATED APPLICATION

This application claims the priority of Republic of Korea Patent Application No. 10-2024-0029727 filed on Feb. 29, 2024, which is hereby incorporated by reference in its entirety.

BACKGROUND

Field

The present disclosure relates to a gate driver and a display apparatus including the same.

Description of the Related Art

As it enters an information era, a display field which visually expresses electrical information signals has been rapidly developed, and in response to this, various display apparatuses having excellent performances such as thin-thickness, light weight, and low power consumption have been developed. Examples of such a display apparatus include a liquid crystal display apparatus (LCD), an organic light emitting display apparatus (OLED), and the like.

SUMMARY

A display apparatus includes driving circuits, such as a data driver which supplies a data signal to data lines, a gate driver which supplies a gate signal to gate lines disposed in an active area, and a timing controller configured to control the data driver and the gate driver.

An object to be achieved by the present disclosure is to provide a gate driver which comprises a P-type transistor and a display apparatus including the same.

Another object to be achieved by the present disclosure is to provide a gate driver which improves a response speed and a display apparatus including the same.

Another object to be achieved by the present disclosure is to provide a gate driver which minimizes a bezel size and a display apparatus including the same.

Another object to be achieved by the present disclosure is to provide a gate driver which improves a driving reliability and a display apparatus including the same.

Objects of the present disclosure are not limited to the above-mentioned objects, and other objects, which are not mentioned above, can be clearly understood by those skilled in the art from the following descriptions.

According to an embodiment of the present disclosure, a gate driver includes a plurality of stages, each of the plurality of stages includes: a node controller configured to control voltages of a Q node, a Q2 node, a Qb node, and a QN node connected to transistors based on a first clock signal and a second clock signal; a dummy signal output unit configured to output a dummy signal based on the voltages of the Q node and the Qb node; and a scan signal output unit configured to output a scan signal to a scan line based on the voltages of the Q node and the QN node, and a transistor configured to output a gate low voltage according to a voltage of the Q node as the scan signal, among a configuration of the scan signal output unit, may be a P-type transistor.

According to an embodiment of the present disclosure, a display apparatus includes a display panel including an active area in which a plurality of pixels is disposed; and the gate driver.

Other detailed matters of the exemplary embodiments are included in the detailed description and the drawings.

According to the present disclosure, a rising time and a falling time of a scan signal may be minimized to improve the response speed of the display apparatus.

In the present disclosure, an area occupied by the gate driver may be minimized to reduce a bezel size.

According to the present disclosure, a complete low level may be output to suppress a positive bias temperature stress of the gate driver so that the driving reliability may be improved.

According to the present disclosure, a node voltage fluctuation of the gate driver may be minimized to improve a driving stability of the gate driver.

The effects of the present disclosure are not limited to the aforementioned effects, and other effects, which are not mentioned above, will be apparently understood to a person having ordinary skill in the art from the following description.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
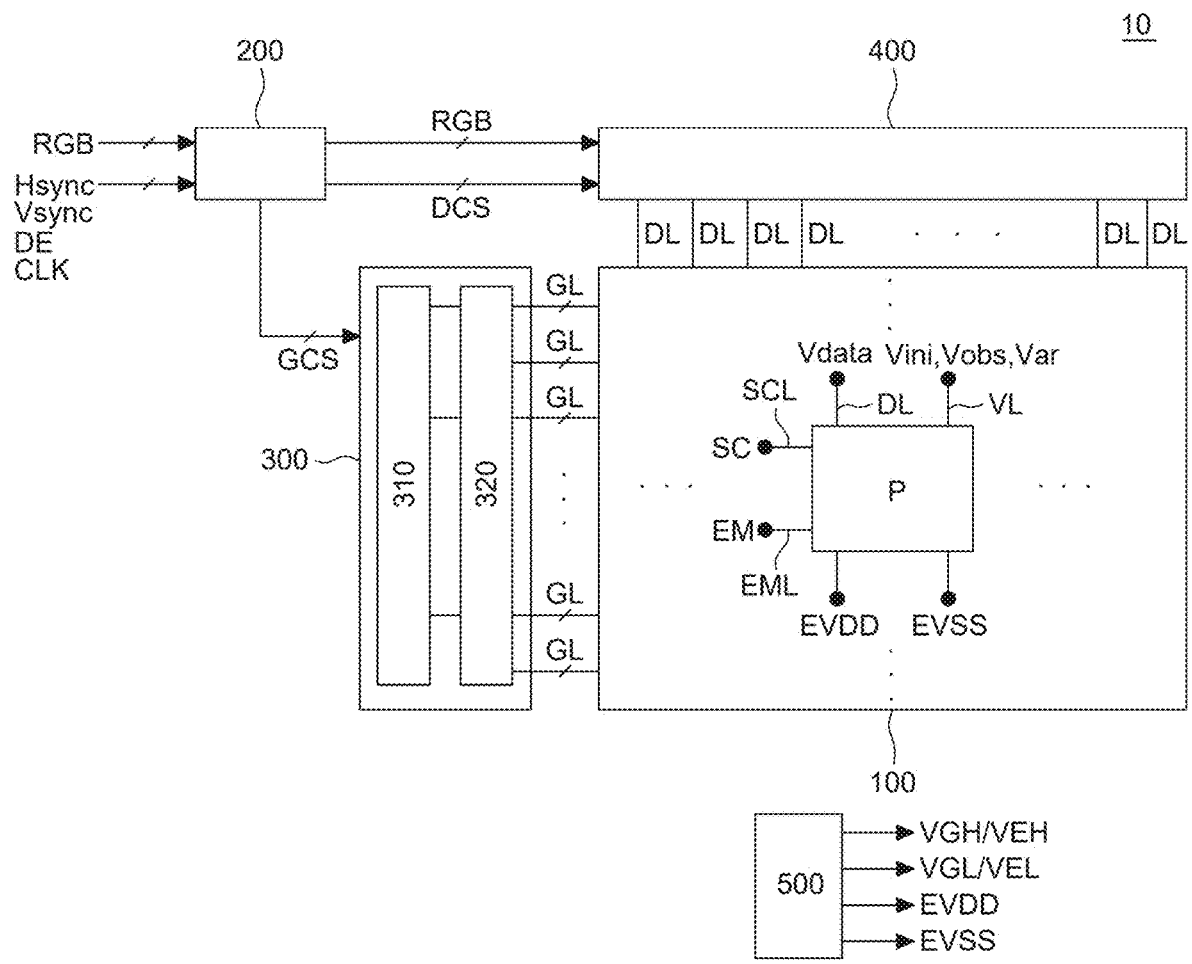
FIG. 1 is a block diagram illustrating a display apparatus according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other. Hereinafter, a display device according to exemplary embodiments of the present disclosure will be described in detail with reference to accompanying drawings.

FIG. 1 is a block diagram schematically illustrating a display apparatus according to an exemplary embodiment of the present disclosure.

Referring to FIG. 1, the display apparatus 10 may include a display panel 100 including a plurality of pixels P, a controller 200, a gate driver 300 which supplies a gate signal to each of the plurality of pixels P, a data driver 400 which supplies a data signal to each of the plurality of pixels P, and a power supply unit 500. The power supply unit 500 supplies the power required for driving to each of the plurality of pixels P.

Figure 2:
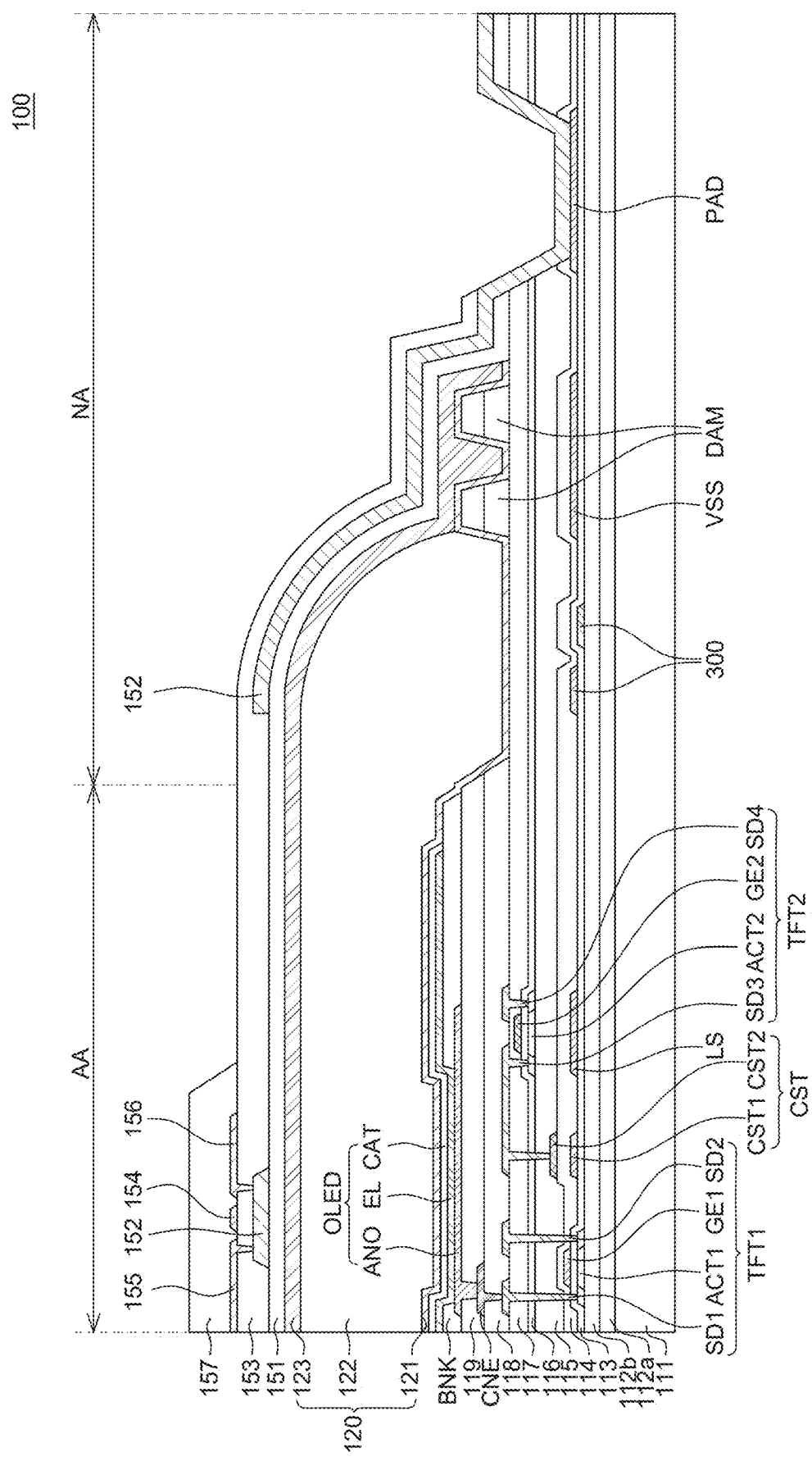
FIG. 2 is a cross-sectional view illustrating a laminated structure of a display apparatus according to an exemplary embodiment.

The display panel 100 may include an active area AA (see FIG. 2) in which pixels P are located and a non-active area NA (see FIG. 2). In the active area AA (see FIG. 2), pixels P may be disposed. The non-active area NA (see FIG. 2) may be disposed in the vicinity of the active area AA or disposed to enclose the active area AA. In the non-active area NA (see FIG. 2), the gate driver 300 and the data driver 400 may be disposed.

In the display panel 100, a plurality of gate lines GL and a plurality of data lines DL may be disposed with each other and a plurality of pixels P may be connected to the gate lines GL and the data line DL, respectively. The plurality of gate lines GL and a plurality of data lines DL may be disposed to intersect each other, but exemplary embodiments of the present disclosure are not limited thereto. For example, one pixel P may be supplied with a gate signal from the gate driver 300 through the gate line GL, may be supplied with a data signal from the data driver 400 through the data line DL, and may be supplied with a high potential driving voltage EVDD and a low potential driving voltage EVSS from the power supply unit 500.

The gate line GL may supply a scan signal SC and an emission control signal EM and the data line DL may supply a data voltage Vdata. Further, according to various exemplary embodiments, the gate line GL may include a plurality of gate lines SCL which supplies a scan signal SC and an emission control signal line EML which supplies the emission control signal EM. Further, the plurality of pixels P further includes a power line VL to be supplied with a bias voltage Vobs and initialization voltages Var and Vini.

Further, each pixel P may include a light emitting diode EL and a pixel circuit configured to control the operation of the light emitting diode OLED, as illustrated in FIG. 2. The light emitting diode OLED may be configured by an anode electrode ANO, a cathode electrode CAT, and an emission layer EL between the anode electrode ANO and the cathode electrode CAT.

The pixel circuit may include a plurality of switching elements, a driving element, and a capacitor. The switching element and the driving element may be configured by thin film transistors. In the pixel circuit, the driving element controls an amount of current to be supplied to the light emitting diode OLED in accordance with the data voltage to adjust an emission amount of the light emitting diode OLED. Further, the plurality of switching elements receives a scan signal SC supplied through the plurality of gate lines SCL and an emission control signal EM supplied through the emission control signal line EML to operate the pixel circuit.

The display panel 100 may be implemented as a non-transmissive display panel or a transmissive display panel. The transmissive display panel may be applied to a transparent display apparatus in which an image is displayed on a screen and real objects in the background are visible. The display panel 100 may be configured as a flexible display panel, but the exemplary embodiments of the present disclosure are not limited thereto.

The flexible display panel may be implemented by an OLED panel which uses a plastic substrate, but the exemplary embodiments of the present disclosure are not limited thereto. For example, the display panel or the flexible display panel may be configured by a quantum dot panel, a micro-LED panel, or a mini-LED panel, but the exemplary embodiments of the present disclosure are not limited thereto.

Each pixel P may include a red pixel, a green pixel, and a blue pixel to implement colors, but the exemplary embodiments of the present disclosure are not limited thereto. Each pixel P may include a white pixel. Each pixel P may include a pixel circuit.

A touch unit or touch sensors may be disposed on the display panel 100. The touch input may be sensed using separate touch sensors or sensed by pixels P. The touch sensors may be disposed on the screen of the display panel in an on-cell type or an add-on type or implemented as in-cell type touch sensors to be embedded in the display panel 100, but the exemplary embodiments of the present disclosure are not limited thereto.

The controller 200 processes image data RGB input from the outside to be suitable for a size and a resolution of the display panel 100 to supply the processed image data to the data driver 400. The controller 200 may generate a gate control signal GCS and a data control signal DCS using synchronization signals input from the outside, for example, a dot clock signal CLK, a data enable signal DE, a horizontal synchronization signal Hsync, and a vertical synchronization signal Vsync. The generated gate control signal GCS and data control signal DCS are supplied to the gate driver 300 and the data driver 400, respectively, to control the gate driver 300 and the data driver 400.

The controller 200 may be configured to be coupled with various processors such as a microprocessor, a mobile processor, or an application processor, depending on a device to be mounted, but the exemplary embodiments of the present disclosure are not limited thereto.

A host system may be any one of a television (TV) system, a set top box, a navigation system, a personal computer PC, a home theater system, a mobile device, a wearable device, and a vehicle system, but the exemplary embodiments of the present disclosure are not limited thereto.

The controller 200 multiples an input frame frequency by i and may control an operating timing of a display panel driver with a frame frequency of an input frame frequency x i (i is a positive integer larger than 0) Hz. The input frame frequency may be 60 Hz in a national television standards committee (NTSC) standard and may be 50 Hz in a phase-alternating line (PAL) standard, but the exemplary embodiments of the present disclosure are not limited thereto.

The controller 200 may generate a signal to allow the pixel P to be driven at various refresh rates. For example, the controller 200 may generate signals associated with the driving to allow the pixel P to be driven in a variable refresh rate (VRR) mode or to be switchable between a first refresh rate and a second refresh rate. For example, the controller 200 may drive the pixel P at various refresh rates by simply changing a rate of a clock signal, generating a synchronization signal to generate a horizontal blank or a vertical blank, or driving the gate driver 300 in a mask manner. The controller 200 may generate a gate control signal GCS for controlling an operating timing of the gate driver 300 and a data control signal DSC for controlling an operating timing of the data driver 400, based on timing signals Vsync, Hsync, and DE received from the host system. The controller 200 controls the operating timing of the display panel driver to synchronize the gate driver 300 and the data driver 400.

A voltage level of the gate control signal GCS output from the controller 200 is converted into gate-on voltages VGL and VEL and gate-off voltages VGH and VEH through a level shifter to be supplied to the gate driver 300. The level shifter converts a low-level voltage of the gate control signal GCS into the gate low voltage VGL and converts a high level voltage of the gate control signal GCS into a gate high voltage VGH. The gate control signal GCS may include a start pulse and a shift clock.

The gate driver 300 may supply the scan signals SC to the gate lines GL in accordance with the gate control signal GCS supplied from the controller 200. The gate driver 300 may be disposed at one side or both sides of the display panel 100 in a gate in panel (GIP) manner, but the exemplary embodiments of the present disclosure are not limited thereto.

The gate driver 300 may sequentially output the gate signals to the plurality of gate lines GL under the control of the controller 200. The gate driver 300 shifts the gate signal using a shift register to sequentially supply the gate signals to the gate lines GL.

The gate signal may include a scan signal SC and an emission control signal EM in the organic light emitting display apparatus. The scan signal SC may include a scan pulse swinging between the gate-on voltage VGL and the gate-off voltage VGH. The emission control signal EM may include an emission control signal pulse swinging between the gate-on voltage VEL and the gate-off voltage VEH.

The scan pulse is synchronized with the data voltage Vdata to select the pixels P of a line in which the data is written. The emission control signal EM may define an emission time of the pixels P.

The gate driver 300 may include an emission control signal driver 310 and at least one or more scan drivers 320.

The emission control signal driver 310 may output an emission control signal pulse in response to a start pulse and a shift clock from the controller 200 and sequentially shift the emission control signal pulse in accordance with a shift clock.

At least one or more scan drivers 320 may output the scan pulse in response to a start pulse and a shift clock from the controller 200 and shift a scan pulse in accordance with the shift clock timing.

The data driver 400 may convert image data RGB into a data voltage Vdata in accordance with the data control signal DCS supplied from the controller 200 and supply the converted data voltage Vdata to the pixel P through the data line DL.

Even though in FIG. 1, it is illustrated that one data driver 400 is disposed at one side of the display panel 100, the number of the data drivers 400 and a placement position thereof are not limited thereto.

For example, the data driver 400 is configured by a plurality of integrated circuits (IC) to be divided into a plurality of parts at one side of the display panel 100, but the exemplary embodiments of the present disclosure are not limited thereto.

The power supply unit 500 may generate a DC power required to drive the pixel array of the display panel 100 and the display panel driver using a DC-DC converter. The DC-DC converter may include a charge pump, a regulator, a buck converter, and a boost converter. The power supply unit 500 receives a DC input voltage applied from the host system to generate a DC voltage, such as a gate-on voltage VGL, VEL, a gate-off voltage VGH, VEH, a high potential driving voltage EVDD, and a low potential driving voltage EVSS. The gate-on voltage VGL, VEL and the gate-off voltage VGH, VEH are supplied to the level shifter and the gate driver 300. The high potential driving voltage EVDD and the low potential driving voltage EVSS may be commonly supplied to the pixels P.

FIG. 2 is a cross-sectional view illustrating a display apparatus according to an exemplary embodiment.

Referring to FIG. 2, FIG. 2 is a cross-sectional view including two switching thin film transistors TFT1 and TFT2 and one storage capacitor Cst. Two thin film transistors TFT1 and TFT2 may include any one thin film transistor, of a switching thin film transistor or a driving transistor including a polycrystalline semiconductor material, and an oxide thin film transistor TFT2 including an oxide semiconductor material. In this case, the thin film transistor including the polycrystalline semiconductor material or a low-temperature polycrystalline semiconductor material is referred to as a polycrystalline thin film transistor TFT1 and the thin film transistor including the oxide semiconductor material is referred to as an oxide thin film transistor TFT2.

The polycrystalline thin film transistor TFT1 illustrated in FIG. 2 may be an emission switching thin film transistor connected to the light emitting diode OLED and the oxide thin film transistor TFT2 may be any one switching thin film transistor connected to the storage capacitor Cst, but the exemplary embodiments of the present disclosure are not limited thereto.

One pixel P may include the light emitting diode OLED and a pixel driving circuit which applies a driving current to the light emitting diode OLED. The pixel driving circuit may be disposed on the substrate 111 and the light emitting diode OLED may be disposed on the pixel driving circuit. An encapsulation layer 120 may be disposed on the light emitting diode OLED. The encapsulation layer 120 may protect the light emitting diode OLED. The light emitting diode OLED is denoted by a reference character OLED, but the light emitting diode OLED is not limited thereto. For example, the light emitting diode OLED may include an inorganic light emitting diode, an organic light emitting diode, a quantum dot light emitting diode, a micro-LED element, or an mini LED element, but the exemplary embodiments of the present disclosure are not limited thereto.

The pixel driving circuit may be referred to as one pixel (P) array unit including a driving thin film transistor, a switching thin film transistor, and a capacitor. The light emitting diode OLED may be referred to as an array unit which includes an anode electrode and a cathode electrode, and an emission layer disposed between the anode electrode and the cathode electrode to emit light.

In one exemplary embodiment, the driving thin film transistor and at least one switching thin film transistor may configure the oxide semiconductors as active layers. The thin film transistor which configures the oxide semiconductor material as an active layer has an excellent leakage current blocking effect and has a manufacturing cost which is cheaper than a thin film transistor which configures a low temperature polycrystalline semiconductor material or a polycrystalline semiconductor material as an active layer. Accordingly, in order to reduce the power consumption and save the manufacturing cost, the pixel driving circuit according to the exemplary embodiment may include a driving thin film transistor and at least one switching thin film transistor which is configured by the oxide semiconductor material.

All the thin film transistors which configure the pixel driving circuit may be implemented using the oxide semiconductor material or only some switching thin film transistors may be implemented using the oxide semiconductor material. For example, any one of the driving thin film transistor and the switching thin film transistor may be configured by one of the oxide semiconductor material, the low temperature polycrystalline semiconductor material, and the polycrystalline semiconductor material, or a combination thereof.

However, it is difficult to ensure the reliability with the thin film transistor using the oxide semiconductor material, but the thin film transistor using a low temperature polycrystalline semiconductor material or a polycrystalline semiconductor material has a rapid operation speed and excellent reliability. Accordingly, the exemplary embodiment may include both the switching thin film transistor using the oxide semiconductor material and the switching thin film transistor configured by a polycrystalline semiconductor material.

The substrate 111 may be configured as a multi-layer in which an organic film and an inorganic film are alternately laminated, but the exemplary embodiments of the present disclosure are not limited thereto. For example, the substrate 111 may be formed by alternately laminating organic films such as polyimide and inorganic films such as silicon oxide (SiO2), but the exemplary embodiments of the present disclosure are not limited thereto.

A lower buffer layer 112a may be formed on the substrate 111. The lower buffer layer 112a is provided to block moisture penetrating from the outside and may be formed by laminating a plurality of silicon oxide (SiO2) films. An auxiliary buffer layer 112b may be further disposed on the lower buffer layer 112a to protect the element from the moisture permeation, but the exemplary embodiments of the present disclosure are not limited thereto.

The polycrystalline thin film transistor TFT1 may be formed on the substrate 111. The polycrystalline thin film transistor TFT1 may configure the polycrystalline semiconductor as an active layer. The polycrystalline thin film transistor TFT1 may include a first active layer ACT1 including a channel through which electrons or holes move, a first gate electrode GE1, a first source electrode SD1, and a first drain electrode SD2.

The first active layer ACT1 may include a first channel region, a first source region which is disposed on one side of the first channel region and a first drain region disposed on the other side. The first source region and the first drain region are disposed with the first channel region therebetween.

The first source region and the first drain region may be regions in which an intrinsic polycrystalline semiconductor material is doped with group 5 or group 3 impurity ions, for example, phosphorus (P) or boron (B) at a predetermined concentration to be conductive, but the exemplary embodiments of the present disclosure are not limited thereto. In the first channel region, the polycrystalline semiconductor material maintains an intrinsic state and a path through which the electrons or holes move may be provided.

The polycrystalline thin film transistor TFT1 may include a first gate electrode GE1 which overlaps the first channel region of the first active layer ACT1. A first insulating layer 113 may be disposed between the first gate electrode GE1 and the first active layer ACT1. The first insulating layer 113 may be configured by laminating inorganic layers, such as a silicon oxide (SiO2) film or silicon nitride (SiNx) as a single layer or multiple layers, but the exemplary embodiments of the present disclosure are not limited thereto.

In the exemplary embodiment, the polycrystalline thin film transistor TFT1 may have a top gate structure in which the first gate electrode GE1 is located above the first active layer ACT1, but the exemplary embodiments of the present disclosure are not limited thereto. Accordingly, a first electrode CST1 included in a storage capacitor Cst and a light shielding layer LS included in the oxide thin film transistor TFT2 may be formed with the same material as the first gate electrode GE1, but the exemplary embodiments of the present disclosure are not limited thereto. The first gate electrode GE1, the first electrode CST1, and the light shielding layer LS are formed by one mask process so that the number of mask processes may be reduced.

The first gate electrode GE1 may be configured by a metal material. For example, the first gate electrode GE1 may be a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

A second insulating layer 114 may be disposed on the first gate electrode GE1. The second insulating layer 114 may be configured by silicon oxide (SiO2) or silicon nitride (SiNx), but the exemplary embodiments of the present disclosure are not limited thereto.

The display panel 100 may further include an upper buffer layer 115, a third insulating layer 116, and a fourth insulating layer 117 which are on the second insulating layer 114. The polycrystalline thin film transistor TFT1 is formed on the fourth insulating layer 117 and may include a first source electrode SD1 and a first drain electrode SD2 connected to a first source region and a first drain region, respectively.

The first source electrode SD1 and the first drain electrode SD2 may be formed of a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but are not limited thereto.

The upper buffer layer 115 separates the second active layer ACT2 of the oxide thin film transistor TFT2 implemented by an oxide semiconductor material from the first active layer ACT1 implemented by a polycrystalline semiconductor material and may provide a base for forming the second active layer ACT2.

The third insulating layer 116 may be disposed on the second active layer ACT2 of the oxide thin film transistor TFT2. The third insulating layer 116 may cover the second active layer ACT2 of the oxide thin film transistor TFT2. The third insulating layer 116 is formed on the second active layer ACT2 implemented by the oxide semiconductor material so that the third insulating layer may be implemented by an inorganic film. However, the third insulating layer 116 may cover the second active layer ACT2 of the oxide thin film transistor TFT2. For example, the third insulating layer 116 may be configured by silicon oxide (SiO2) or silicon nitride (SiNx), but the exemplary embodiments of the present disclosure are not limited thereto.

The second gate electrode GE2 may be configured by a metal material. For example, the second gate electrode GE2 may be a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

The oxide thin film transistor TFT2 may include a second active layer ACT2 which is formed on the upper buffer layer 115 and is implemented by an oxide semiconductor material, a second gate electrode GE2 disposed on the third insulating layer 116, and a second source electrode SD3 and a second drain electrode SD4. The second source electrode SD3 and the second drain electrode SD4 are disposed on the fourth insulating layer 117.

The second active layer ACT2 may include an intrinsic second channel region which is implemented by the oxide semiconductor material and is not doped with an impurity and a second source region and a second drain region which are doped with an impurity to become conductive.

The oxide thin film transistor TFT2 may further include a light shielding layer LS which is located below the upper buffer layer 115 and overlaps the second active layer ACT2. A light shielding layer LS blocks light incident onto the second active layer ACT2 to ensure the reliability of the oxide thin film transistor TFT2. The light shielding layer LS may be formed of the same material as the first gate electrode GE1, but the exemplary embodiments of the present disclosure are not limited thereto. The light shielding layer LS may be formed on an upper surface of the first insulating layer 113. The light shielding layer LS is electrically connected to the second gate electrode GE2 to configure a dual gate, but the exemplary embodiments of the present disclosure are not limited thereto.

The second source electrode SD3 and the second drain electrode SD4 are simultaneously formed of the same material as the first source electrode SD1 and the first drain electrode SD2 on the fourth insulating layer 117 to reduce the number of mask processes. The exemplary embodiments of the present disclosure are not limited thereto.

A second electrode CST2 is disposed on the second insulating layer 114 so as to overlap the first electrode CST1 to implement a storage capacitor Cst. For example, the second electrode CST2 may be a single layer or multiple layers formed of any one of molybdenum (Mo), aluminum (Al), chrome (Cr), gold (Au), titanium (Ti), nickel (Ni), neodymium (Nd), and copper (Cu), or an alloy thereof, but the exemplary embodiments of the present disclosure are not limited thereto.

The storage capacitor Cst may store a data voltage which is applied through the data line DL for a predetermined period and then supply the data voltage to the light emitting diode OLED. The storage capacitor Cst may include two corresponding electrodes and a dielectric material disposed between two electrodes. The second insulating layer 114 may be located between the first electrode CST1 and the second electrode CST2.

The first electrode CST1 or the second electrode CST2 of the storage capacitor Cst may be electrically connected to the second source electrode SD3 or the second drain electrode SD4 of the oxide thin film transistor TFT2. However, it is not limited thereto and a connection relationship of the storage capacitor Cst may vary according to the pixel driving circuit.

A first planarization layer 118 and a second planarization layer 119 may be disposed on the pixel driving circuit to planarize an upper end of the pixel driving circuit. The first planarization layer 118 and the second planarization layer 119 may be an organic film such as polyimide or acryl resin, but the exemplary embodiments of the present disclosure are not limited thereto.

The light emitting diode OLED may be formed on the second planarization layer 119.

The light emitting diode OLED may include an anode electrode ANO, a cathode electrode CAT, and an emission layer EL disposed between the anode electrode ANO and the cathode electrode CAT. If a pixel driving circuit which commonly uses a low potential voltage connected to the cathode electrode CAT is implemented, the anode electrode ANO may be disposed in every sub pixel as a separate electrode. If a pixel driving circuit which commonly uses a high potential voltage is implemented, the cathode electrode CAT may be disposed as a separate electrode in every sub pixel.

The light emitting diode OLED may be electrically connected to the driving element through an intermediate electrode CNE disposed on the first planarization layer 118. For example, the anode electrode ANO of the light emitting diode OLED and the first source electrode SD1 of the polycrystalline thin film transistor TFT1 which configures the pixel driving circuit may be connected to each other by the intermediate electrode CNE.

The anode electrode ANO may be connected to the intermediate electrode CNE exposed through the contact hole which passes through the second planarization layer 119. Further, the intermediate electrode CNE may be connected to the first source electrode SD1 exposed through the contact hole which passes through the first planarization layer 118.

The intermediate electrode CNE may serve as a medium connecting the first source electrode SD1 and the anode electrode ANO. The intermediate electrode CNE may be formed of a conductive material, such as copper (Cu), silver (Ag), molybdenum (Mo), or titanium (Ti), but the exemplary embodiments of the present disclosure are not limited thereto.

The anode electrode ANO may be formed to have a multi-layered structure including a transparent conductive film and an opaque conductive film having high reflection efficiency, but the exemplary embodiments of the present disclosure are not limited thereto. The transparent conductive film may be formed of a material having a relatively high work function, such as indium-tin-oxide (ITO) or indium-zinc-oxide (IZO) and the opaque conductive film may be formed with a single or multilayered structure including aluminum (Al), silver (Ag), copper (Cu), lead (Pb), molybdenum (Mo), titanium (Ti), or an alloy thereof. However, the exemplary embodiments of the present disclosure are not limited thereto. For example, the anode electrode ANO may be formed with a structure in which a transparent conducting film, an opaque conducting film, and a transparent conducting film are sequentially laminated or a structure in which a transparent conducting film and an opaque conducting film are sequentially laminated. However, the exemplary embodiments of the present disclosure are not limited thereto.

The emission layer EL may be formed by laminating a hole-related layer, an organic emission layer, and an electron-related layer on the anode electrode ANO in this order or in a reverse order, but the exemplary embodiments of the present disclosure are not limited thereto.

A bank layer BNK may be a pixel definition film which exposes the anode electrode ANO of each pixel P. The bank layer BNK may be formed of an opaque material (for example, black) to suppress the light interference between adjacent pixels P. In this case, the bank layer BNK may include a light shielding material which is formed of at least any one of a color pigment, organic black, and carbon. For example, the bank layer BNK may be configured by a material including a black pigment or an organic material, such as benzocyclobutene resin, polyimide resin, acryl resin, or a photosensitive polymer, but the exemplary embodiments of the present disclosure are not limited thereto. When the bank layer BNK is configured with a material including a black pigment or a black dye, the bank layer may be a black bank. When the bank layer BNK is configured with a material including a black pigment or a black dye, light from the outside may be blocked and the luminance of the display apparatus may be further improved. A spacer may be further disposed on the bank layer BNK. For example, the spacer may include an organic insulating material, and the exemplary embodiments of the present disclosure are not limited thereto. The spacer may be formed of the same material as the bank layer BNK, but the exemplary embodiments of the present disclosure are not limited thereto.

The cathode electrode CAT may be formed on an upper surface and a side surface of the emission layer EL so as to be opposite to the anode electrode ANO with the emission layer EL therebetween. The cathode electrode CAT may be integrally formed on the entire active area AA. When the cathode electrode CAT is applied to a top-emission type organic light emitting display apparatus, the cathode electrode may be configured by a transparent conducting film, such as indium-tin-oxide (ITO) or indium-zinc-oxide (IZO), but the exemplary embodiments of the present disclosure are not limited thereto.

The encapsulation layer 120 may be further disposed on the cathode electrode CAT to suppress moisture permeation.

The encapsulation layer 120 may block moisture or oxygen from being permeated into the light emitting diode OLED which is vulnerable to the moisture or oxygen from the outside. To this end, the encapsulation layer 120 may include at least one inorganic encapsulation layer and at least one organic encapsulation layer, but is not limited thereto. In the present disclosure, a structure of the encapsulation layer 120 in which a first encapsulation layer 121, a second encapsulation layer 122, and a third encapsulation layer 123 are sequentially laminated will be described as an example, but the exemplary embodiments of the present disclosure are not limited thereto.

The first encapsulation layer 121 may be formed on the substrate 111 on which the cathode electrode CAT is formed. The third encapsulation layer 123 is formed on the substrate 111 on which the second encapsulation layer 122 is formed and encloses a top surface, a bottom surface, and a side surface of the second encapsulation layer 122 together with the first encapsulation layer 121. The first encapsulation layer 121 and the third encapsulation layer 123 may minimize or suppress the permeation of external moisture or oxygen into the light emitting diode OLED. The first encapsulation layer 121 and the third encapsulation layer 123 may be formed of an inorganic insulating material on which low-temperature deposition is allowed, such as silicon nitride (SiNx), silicon oxide (SiOx), silicon oxynitride (SiON), or aluminum oxide (Al2O3), but the exemplary embodiments of the present disclosure are not limited thereto. The first encapsulation layer 121 and the third encapsulation layer 123 are deposited under a low temperature atmosphere so that the damage of the light emitting diode OLED which is vulnerable to a high temperature atmosphere may be suppressed during the deposition process of the first encapsulation layer 121 and the third encapsulation layer 123.

The second encapsulation layer 122 serves as a buffer which alleviates stress between layers due to the bending of the display apparatus 10 and may planarize the step between layers. The second encapsulation layer 122 may be formed of acryl resin, epoxy resin, phenolic resin, polyamide resin, polyimide resin, and polyethylene or a non-photosensitive organic insulating material such as silicon oxy carbon (SiOC), or a photosensitive organic insulating material such as photoacryl, on the substrate 111 on which the first encapsulation layer 121 is formed, but is not limited thereto. When the second encapsulation layer 122 is formed using an inkjet method, a dam DAM may be disposed to suppress a liquefied second encapsulation layer 122 from being diffused to an edge of the substrate 111. The dam DAM may be disposed to be closer to the edge of the substrate 111 than the second encapsulation layer 122. The dam DAM may suppress the second encapsulation layer 122 from being diffused into a pad region where a conductive pad disposed at an outermost periphery of the substrate 111 is disposed.

The dam DAM is designed to suppress the diffusion of the second encapsulation layer 122. However, when the second encapsulation layer 122 is formed to exceed a height of the dam DAM during the process, the second encapsulation layer 122 which is an organic layer may be exposed to the outside so that moisture, etc. may be easily permeated into the light emitting diode. Accordingly, in order to suppress this problem, at least one or more dams DAM may be formed to overlap, but the exemplary embodiments of the present disclosure are not limited thereto.

The dam DAM may be disposed on the fourth insulating layer 117 of the non-active area NA.

Further, the dam DAM may be simultaneously formed with the first planarization layer 118 and the second planarization layer 119. When the first planarization layer 118 is formed, a lower layer of the dam DAM is formed together and when the second planarization layer 119 is formed, an upper layer of the dam DAM is formed together. Therefore, the dam DAM may be laminated to have a double-layered structure, but the exemplary embodiments of the present disclosure are not limited thereto.

Therefore, the dam DAM may be configured with the same material as the first planarization layer 118 and the second planarization layer 119, but is not limited thereto.

The dam DAM may be formed to overlap a low potential driving power line VSS. For example, on a lower layer of a region of the non-active area NA where the dam DAM is located, the low potential driving power line VSS may be formed.

The low potential driving power line VSS and the gate driver 300 configured in a gate-in-panel (GIP) manner are formed to enclose the outer periphery of the display panel and the low potential driving power line VSS may be located at the outer periphery more than the gate driver 300. Further, the low potential driving power line VSS is connected to the cathode electrode CAT to apply a common voltage. Even though the gate driver 300 is simply illustrated in a plan view and a cross-sectional view, the gate driver 300 may be configured using a thin film transistor having the same structure as the thin film transistor of the active area AA.

The low potential driving power line VSS is disposed at the outside more than the gate driver 300. The low potential driving power line VSS is disposed at the outside more than the gate driver 300 and encloses the active area AA. For example, the low potential driving power line VSS may be formed of the same material as the first gate electrode GE1, but is not limited thereto and may be formed of the same material as the second electrode CST2 or the first source and drain electrodes SD1 and SD2, but is not limited thereto.

Further, the low potential driving power line VSS may be electrically connected to the cathode electrode CAT. The low potential driving power line VSS may supply a low potential driving voltage EVSS to the plurality of pixels P of the active area AA.

A touch layer may be disposed on the encapsulation layer 120. A buffer film 151 may be disposed between a touch sensor metal including touch electrode connection lines 152 and 154 and touch electrodes 155 and 156 and a cathode electrode CAT of the light emitting diode OLED on the touch layer.

The buffer film 151 may suppress the permeation of a chemical solution (a developer or an etchant) used for a manufacturing process of a touch sensor metal disposed on the buffer film 151 or moisture from the outside into the emission layer EL including an organic material. By doing this, the buffer film 151 may suppress the damage of the emission layer EL which is vulnerable to the chemical solution or the moisture.

The buffer film 151 may be formed of an organic insulating material which is formed at a temperature lower than a predetermined temperature (for example, 100° C.) to suppress the damage of the emission layer EL including an organic material which is vulnerable to a high temperature and formed with the organic insulating material which has a low permittivity of 1 to 3, but the exemplary embodiments of the present disclosure are not limited thereto. For example, the buffer film 151 may be formed of an acrylic, epoxy, or siloxane-based material, but the exemplary embodiments of the present disclosure are not limited thereto. The buffer film 151 which is formed of an organic insulating material and has a planarization performance may suppress a damage of the encapsulation layer 120 caused by the bending of the organic light emitting display apparatus and the breakage of the touch sensor metal formed on the buffer film 151.

According to a mutual-capacitance-based touch sensor structure, the touch electrodes 155 and 156 are disposed on the touch buffer film 151 and the touch electrodes 155 and 156 may be alternately disposed, but the exemplary embodiments of the present disclosure are not limited thereto.

The touch electrode connection lines 152 and 154 may electrically connect the touch electrodes 155 and 156. The touch electrode connection lines 152 and 154 and the touch electrodes 155 and 156 may be located on different layers with the insulating film 153 therebetween, but the exemplary embodiments of the present disclosure are not limited thereto.

The touch electrode connection lines 152 and 154 are disposed to overlap the bank layer BNK to suppress the degradation of the aperture ratio.

In the touch electrodes 155 and 156, a part of the touch electrode connection line 152 passes through an upper portion and a side surface of the encapsulation layer 120 and an upper portion and a side surface of the dam DAM to be electrically connected to a touch driving circuit through the touch pad PAD.

A part of the touch electrode connection line 152 is supplied with a touch driving signal from the touch driving circuit to transmit the touch driving signal to the touch electrodes 155 and 156 and transmit a touch sensing signal in the touch electrodes 155 and 156 to the touch driving circuit.

A touch protection film 157 may be disposed on the touch electrodes 155 and 156. In the drawing, even though it is illustrated that the touch protection film 157 is disposed only on the touch electrodes 155 and 156, it is not limited thereto and the touch protection film 157 extends before and after the dam DAM to be disposed on the touch electrode connection line 152.

A color filter may be further disposed on the encapsulation layer 120. The color filter may be located on the touch layer or located between the encapsulation layer 120 and the touch layer, but the exemplary embodiments of the present disclosure are not limited thereto.

Figure 3:
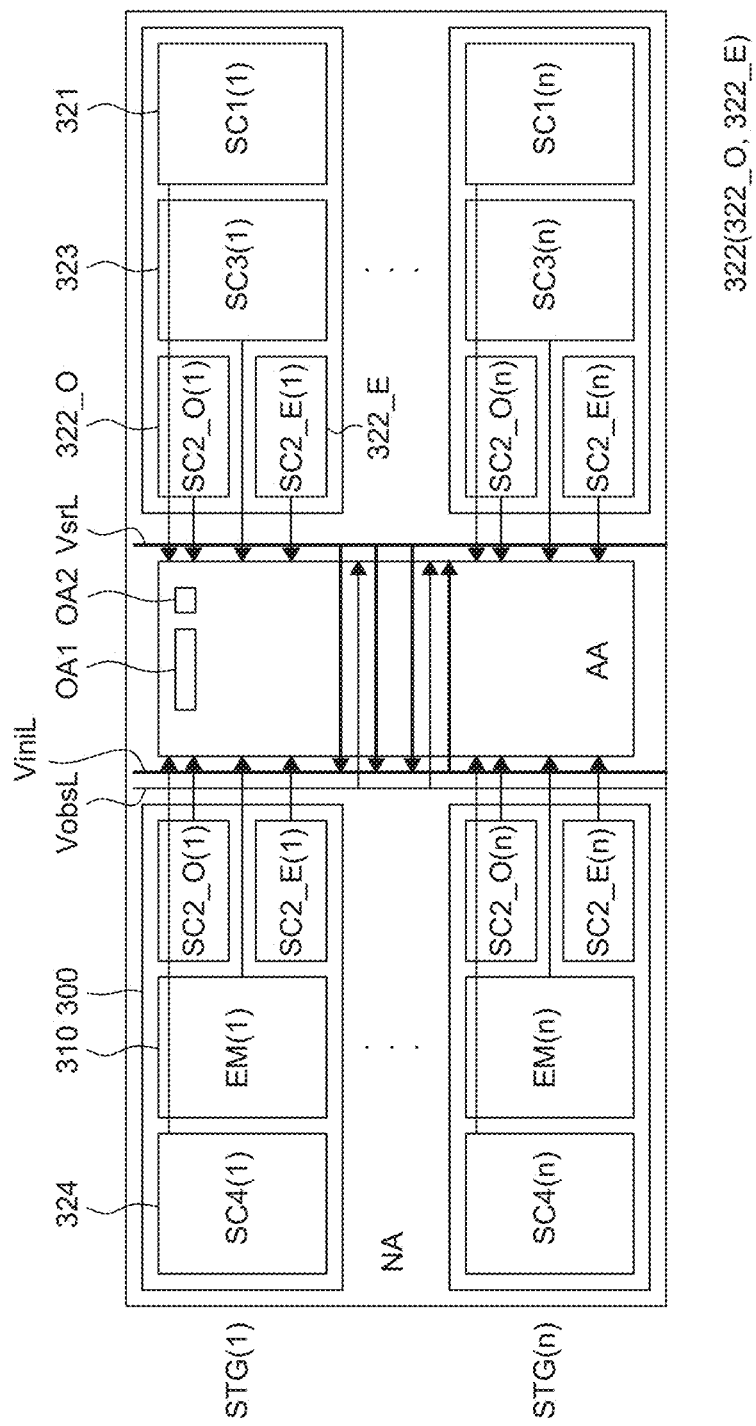
FIG. 3 is a view of a configuration of a gate driver in a display apparatus according to an exemplary embodiment of the present disclosure.

FIG. 3 is a view of a configuration of a gate driver in a display apparatus according to an exemplary embodiment of the present disclosure.

Referring to FIG. 3, the gate driver 300 may include an emission control signal driver 310 and a scan driver 320. The scan driver 320 may be configured by first to fourth scan drivers 321, 322, 323, and 324. Further, the second scan driver 322 may be configured by an odd-numbered second scan driver 322_O and an even-numbered second scan driver 322_E.

In the gate driver 300, shift registers may be symmetrically disposed on both sides of the active area AA. Further, a shift register at one side of the active area AA of the gate driver 300 may include second scan drivers 322_O and 322_E, a fourth scan driver 324, and an emission control signal driver 310, respectively. A shift register at the other side of the active area AA may include a first scan driver 321, second scan drivers 322_O and 322_E, and a third scan driver 323, respectively. However, the present disclosure is not limited thereto and the emission control signal driver 310 and the first to fourth scan drivers 321, 322, 323, and 324 may be disposed in different ways according to the exemplary embodiments.

Each of stages STG1 to STGn of the shift register may include first scan signal generators SC1(1) to SC1(n), second scan signal generators SC2_O(1) to SC2_O(n), SC2_E(1) to SC2_E(n), third scan signal generators SC3(1) to SC3(n), fourth scan signal generators SC4(1) to SC4(n), and emission control signal generators EM(1) to EM(n).

The first scan signal generators SC1(1) to SC1(n) may output first scan signals SC1(1) to SC1(n) through first gate lines SCL1 of the display panel 100. The second scan signal generators SC2_O(1) to SC2_O(n), SC2_E(1) to SC2_E(n) may output second scan signals SC2(1) to SC2(n) through second gate lines SCL2 of the display panel 100. The third scan signal generators SC3(1) to SC3(n) may output third scan signals SC3(1) to SC3(n) through third gate lines SCL3 of the display panel 100. The fourth scan signal generators SC4(1) to SC4(n) may output fourth scan signals SC4(1) to SC4(n) through fourth gate lines SCL4 of the display panel 100. The emission control signal generators EM(1) to EM(n) may output emission control signals EM(1) to EM(n) through emission control signal lines EML of the display panel 100.

The first scan signals SC1(1) to SC1(n) may be used as signals to drive an A-th transistor (for example, a compensation transistor) included in the pixel circuit. The second scan signals SC2(1) to SC2(n) may be used as signals to drive a B-th transistor (for example, a data supply transistor) included in the pixel circuit. The third scan signals SC3(1) to SC3(n) may be used as signals to drive a C-th transistor (for example, a bias transistor) included in the pixel circuit. The fourth scan signals SC4(1) to SC4(n) may be used as signals to drive a D-th transistor (for example, an initialization transistor) included in the pixel circuit. The emission control signals EM(1) to EM(n) may be used as signals to drive an E-th transistor (for example, an emission control transistor) included in the pixel circuit. For example, when the emission control transistors of pixels are controlled using emission control signals EM(1) to EM(n), the emission time of the light emitting diode may be variable.

Referring to FIG. 3, a bias voltage bus line VobsL, a first initialization voltage bus line VarL, and a second initialization voltage bus line ViniL may be disposed between the gate driver 300 and the active area AA.

The bias voltage bus line VobsL, the first initialization voltage bus line VarL, and the second initialization voltage bus line ViniL may supply a bias voltage Vobs, a first initialization voltage Var, and a second initialization voltage Vini from the power supply unit 500 to the pixel circuit.

In the drawing, it is illustrated that each of the bias voltage bus line VobsL, the first initialization voltage bus line VarL, and the second initialization voltage bus line ViniL is disposed at only one side of a left side or a right side of the active area AA, but the present disclosure is not limited thereto, and may be disposed at both sides. Further, even though each of the bias voltage bus line VobsL, the first initialization voltage bus line VarL, and the second initialization voltage bus line ViniL is disposed at one side, it is not limited to a left position or a right position.

Referring to FIG. 3, in the active area AA, one or more optical areas OA1 and OA2 may be disposed.

One or more optical areas OA1 and OA2 may be disposed so as to overlap one or more optical electronic devices, such as an image capturing device such as a camera (image sensor) and a detection sensor such as a proximity sensor and an illuminance sensor.

In one or more optical areas OA1 and OA2, a light transmission structure is formed to have a predetermined level or higher of transmittance for the operation of an optical electronic device. For example, the number of pixels P per unit area in one or more optical areas OA1 and OA2 may be smaller than the number of pixels P per unit area in a normal area excluding the optical areas OA1 and OA2, in the active area AA. For example, the resolution of one or more optical areas OA1 and OA2 may be lower than a resolution of a normal area in the active area AA.

A light transmission structure in one or more optical areas OA1 and OA2 may be configured by patterning the cathode electrode in a part in which the pixel P is not disposed. The cathode electrode to be patterned may be removed using laser or the cathode electrode is selectively formed using a material such as a cathode anti-deposition layer to be patterned, but the exemplary embodiments of the present disclosure are not limited thereto.

Further, in one or more optical areas OA1 and OA2, the optical transmission structure may be configured by separately forming the light emitting diode OLED and the pixel circuit in the pixel P, but the exemplary embodiments of the present disclosure are not limited thereto. For example, the light emitting diode OLED of the pixel P is located on the optical areas OA1 and OA2 and the plurality of transistors TFT which configures the pixel circuit is disposed in the vicinity of the optical areas OA1 and OA2. Therefore, the light emitting diode OLED and the pixel circuit may be electrically connected by means of a transparent metal layer.

Figure 4:
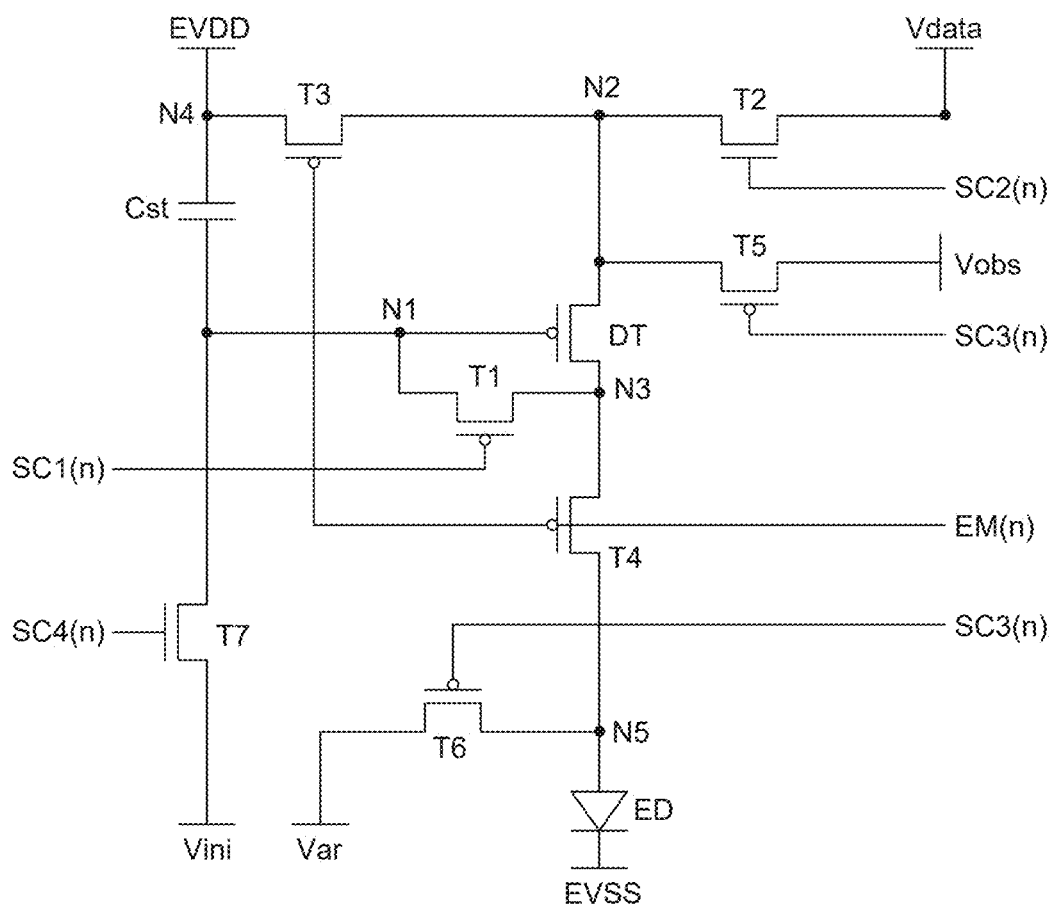
FIG. 4 is a view for a pixel circuit in a display apparatus according to an exemplary embodiment of the present disclosure.

FIG. 4 is a view for a pixel circuit in a display apparatus according to an exemplary embodiment of the present disclosure.

FIG. 4 just exemplarily illustrates the pixel circuit for description purposes and it is not specifically limited as long as the structure can control the emission of the light emitting diode ED by applying an EM signal EM(n). For example, the pixel circuit may include an additional scan signal, a switching thin film transistor connected thereto, and a switching thin film transistor to which an additional initialization voltage is applied. Further, a connection relationship of a switching element or a connection location of a capacitor may be disposed in various manners. Hereinafter, for the convenience of description, a display apparatus with a pixel circuit structure of FIG. 4 will be described.

Referring to FIG. 4, each of the plurality of pixels P may include a pixel circuit having a driving transistor DT and a light emitting diode ED connected to the pixel circuit.

The pixel circuit controls the driving current which flows in the light emitting diode ED to drive the light emitting diode ED. The pixel circuit may include the driving transistor DT, first to seventh transistors T1 to T7, and the storage capacitor Cst, but the exemplary embodiments of the present disclosure are not limited thereto. Each of the transistors DT and T1 to T7 may include a first electrode, a second electrode, and a gate electrode. One of the first electrode and the second electrode may be a source electrode and the other one of the first electrode and the second electrode may be a drain electrode.

Each of the transistors DT and T1 to T7 may be a P-type thin film transistor or an N-type thin film transistor. In the exemplary embodiment of FIG. 4, the first transistor T1, the second transistor T2, and the seventh transistor T7 are N-type thin film transistors and the remaining transistors DT, T3 to T6 are P-type thin film transistors. However, it is not limited thereto and depending on the exemplary embodiment, all or some of the transistors DT and T1 to T7 may be P-type thin film transistors or N-type thin film transistors. Further, the N-type thin film transistor may be an oxide thin film transistor and the P-type thin film transistor may be a polycrystalline silicon thin film transistor. For example, one of the transistors DT and T1 to T7 may be configured by one of the P-type thin film transistor and the N-type thin film transistor or a combination thereof.

Hereinafter, it is exemplarily described that the first transistor T1, the second transistor T2, and the seventh transistor T7 are N-type thin film transistors and the remaining transistors DT, T3 to T6 are P-type thin film transistors, but the exemplary embodiments of the present disclosure are not limited thereto. Accordingly, a high voltage is applied to the first transistor T1, the second transistor T2, and the seventh transistor T7 to be turned on and a low voltage is applied to the remaining transistors DT, T3 to T6 to be turned on.

According to the exemplary embodiment, the first transistor T1 which configures the pixel circuit may serve as a compensation transistor, the second transistor T2 may serve as a data supply transistor, the third and fourth transistors T3 and T4 may serve as emission control transistors, and the fifth transistor T5 may serve as a bias transistor. Further, the sixth and seventh transistors T6 and T7 may serve as initialization transistors. However, the exemplary embodiments of the present disclosure are not limited thereto.

The light emitting diode ED may include an anode electrode and a cathode electrode. The anode electrode of the light emitting diode ED may be connected to a fifth node N5 and the cathode electrode may be connected to a low potential driving voltage EVSS.

The driving transistor DT may include a first electrode connected to a second node N2, a second electrode connected to a third node N3, and a gate electrode connected to a first node N1. The driving transistor DT may provide a driving current to the light emitting diode ED based on a voltage of the first node N1 (or a data voltage stored in the storage capacitor Cst to be described below). For example, the driving transistor DT may be connected between a second node N2 and a third node N3.

The first transistor T1 may include a first electrode connected to the first node N1, a second electrode connected to the third node N3, and a gate electrode which receives a first scan signal SC1(n). The first transistor T1 is turned on in response to the first scan signal SC1(n) and is diode-connected between the first node N1 and the third node N3 to sample a threshold voltage (Vth) of the driving transistor DT. The first transistor T1 may be a compensation transistor, but the exemplary embodiments of the present disclosure are not limited thereto. For example, the first transistor T1 may be connected between the first node N1 and the third node N3.

The storage capacitor Cst may be connected or formed between the first node N1 and a fourth node N4. The storage capacitor Cst may store or maintain the supplied high potential driving voltage EVDD.

The second transistor T2 may include a first electrode which is connected to a data line DL (or receives a data voltage Vdata), a second electrode connected to the second node N2, and a gate electrode which receives a second scan signal SC2(n). The second transistor T2 is turned on in response to a second scan signal SC2(n) and may transmit the data voltage Vdata to the second node N2. Such a second transistor T2 may be a data supply transistor, but the exemplary embodiments of the present disclosure are not limited thereto. For example, the second transistor T2 may be connected between the data line and the second node N2.

The third transistor T3 and the fourth transistor T4 (or first and second emission control transistors) may be connected between the high potential driving voltage EVDD and the light emitting diodes ED and form a current movement path through which the driving current generated by the driving transistor DT moves.

The third transistor T3 may include a first electrode which is connected to the fourth node N4 to receive a high potential driving voltage EVDD, a second electrode connected to the second node N2, and a gate electrode which receives an emission control signal EM(n). For example, the third transistor T3 may be connected between the fourth node N4 and the second node N2.

The fourth transistor T4 may include a first electrode connected to the third node N3, a second electrode connected to the fifth node N5 (or the anode electrode of the light emitting diode ED), and a gate electrode which receives the emission control signal EM(n). For example, the fourth transistor T4 may be connected between the third node N3 and the fifth node N5.

The third and fourth transistors T3 and T4 are turned on in response to the emission control signal EM(n) and in this case, the driving current is supplied to the light emitting diode ED and the light emitting diode ED may emit light with a luminance corresponding to the driving current.

The fifth transistor T5 may include a first electrode which receives a bias voltage Vobs, a second electrode connected to the second node N2, and a gate electrode which receives a third scan signal SC3(n). The fifth transistor T5 may be a bias transistor, but the exemplary embodiments of the present disclosure are not limited thereto. For example, the fifth transistor T5 may be connected between the bias voltage line and the second node N2.

The sixth transistor T6 may include a first electrode which receives a first initialization voltage Var, a second electrode connected to the fifth node N5, and a gate electrode which receives the third scan signal SC3(n). For example, the sixth transistor T6 may be connected between the initialization voltage line and the fifth node N5.

The sixth transistor T6 is turned on in response to the third scan signal SC3(n), before the light emitting diode ED emits light (or after the light emitting diode ED emits light) and may initialize the anode electrode (or the pixel electrode) of the light emitting diode ED using the first initialization voltage Var. The light emitting diode ED may have a parasitic capacitor formed between the anode electrode and the cathode electrode. The parasitic capacitor is charged while the light emitting diode ED emits light so that the anode electrode of the light emitting diode ED may have a specific voltage. Accordingly, the first initialization voltage Var is applied to the anode electrode of the light emitting diode ED through the sixth transistor T6 to initialize a quantity of charges accumulated in the light emitting diode ED.

In the present disclosure, the gate electrodes of the fifth and sixth transistors T5 and T6 are configured to commonly receive the third scan signal SC3(n). However, the present disclosure is not essentially limited thereto and the gate electrodes of the fifth and sixth transistors T5 and T6 may be configured to receive separate scan signals to independently controlled.

The seventh transistor T7 may include a first electrode which receives a second initialization voltage *Vini*, a second electrode connected to the first node N1, and a gate electrode which receives a fourth scan signal SC4(n). For example, the seventh transistor T7 may be connected between the initialization voltage line and the first node N1.

The seventh transistor T7 is turned on in response to the fourth scan signal SC4(n) and may initialize the gate electrode of the driving transistor DT using the second initialization voltage Vini. In the gate electrode of the driving transistor DT, unnecessary charges may remain due to the high potential driving voltage EVDD stored in the storage capacitor Cst. Accordingly, the second initialization voltage Vini is applied to the gate electrode of the driving transistor DT through the seventh transistor T7 to initialize the remaining quantity of charges.

Figure 5A:
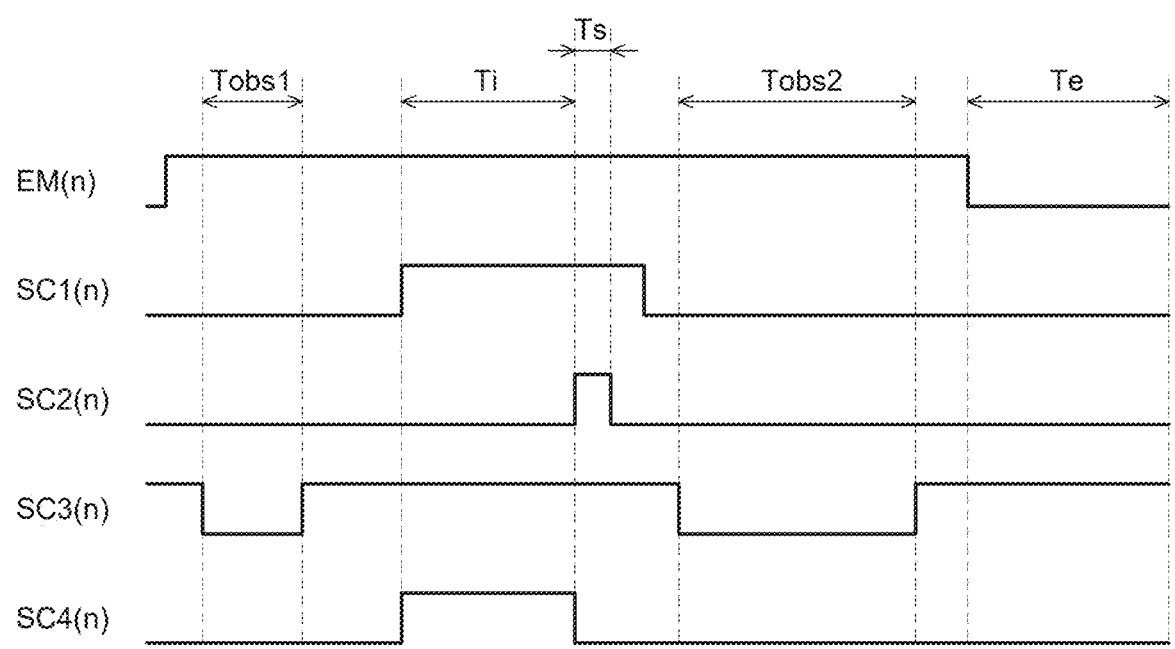
FIGS. 5A and 5B are views for explaining an operation of a scan signal and an emission control signal in a refresh period and a hold period in a pixel circuit illustrated in FIG. 4 according to an exemplary embodiment of the present disclosure.
Figure 5B:
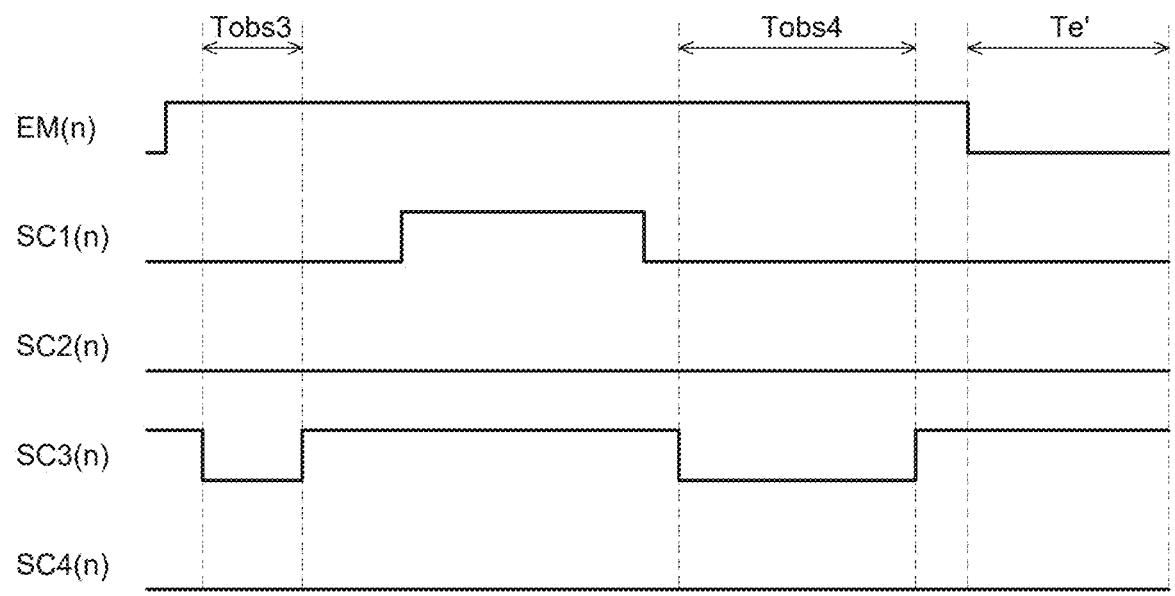

FIGS. 5A and 5B are views for explaining an operation of a scan signal and an emission control signal in a refresh period and a hold period in a pixel circuit illustrated in FIG. 4 according to one embodiment.

A display apparatus according to the exemplary embodiment of the present disclosure may operate as a variable refresh rate (VRR) mode display apparatus, but the exemplary embodiments of the present disclosure are not limited thereto. In the VRR mode, the pixel is driven at a constant frequency and at the time when a high-speed driving is necessary, a refresh rate at which the data voltage Vdata is updated is increased to operate the pixel or at a time when the power consumption needs to be lowered or low-speed driving is necessary, the refresh rate is lowered to operate the pixel.

Each of the plurality of pixels P may be driven by a combination of a refresh frame and a hold frame in one second. In the present disclosure, one set may be defined that a combination of a refresh period in which the data voltage Vdata is updated and a hold period in which the data voltage Vdata is not updated is repeated for one second. One set period may be a period in which a combination of the refresh period and the hold period is repeated.

When the refresh rate is driven at 120 Hz, it may be driven only during the refresh period. For example, the refresh period may be driven 120 times in one second. One refresh period may be $1/120=8.33$ ms (milliseconds) and one set period may also be 8.33 ms.

When the refresh rate is driven at 60 Hz, the refresh period and the hold period may be alternately driven. For example, the refresh period and the hold period may be alternately driven 60 times each in one second. Each of one refresh period and one hold period may be $0.5/60=8.33$ ms and one set period may be 16.66 ms.

When the refresh rate is driven at 1 Hz, one frame may be driven with one refresh period and 119 hold periods after the one refresh period. Further, when the refresh rate is driven at 1 Hz, one frame may be driven with a plurality of refresh periods and a plurality of hold periods. Each of one refresh period and one hold period may be $1/120=8.33$ ms and one set period may be 1 s (second).

In the refresh period, a new data voltage Vdata is charged to apply a new data voltage Vdata to the driving transistor DT and in the hold period, a data voltage Vdata of a previous frame is held to be used as it is. In the hold period, a process of applying the new data voltage Vdata to the driving transistor DT is omitted so that the hold period may also be referred to as a skip period.

Each of the plurality of pixels P may initialize a voltage which is charged in the pixel circuit or remains during the refresh period. For example, each of the plurality of pixels P may remove the influence of the data voltage Vdata and the high potential driving voltage EVDD stored in the previous frame in the refresh period. Accordingly, each of the plurality of pixels P may display an image corresponding to a new data voltage Vdata in the hold period.

Each of the plurality of pixels P supplies a driving current corresponding to the data voltage Vdata to the light emitting diode ED to display images and may maintain a turned-on state of the light emitting diode ED, during the hold period.

First, the driving of the pixel circuit and the light emitting diode in the refresh period of FIG. 5A will be described. The refresh period may include at least one bias period Tobs1 and Tobs2, an initialization period Ti, a sampling period Ts, and an emission period Te, but this is just an exemplary embodiment and is not necessarily limited to this order.

Referring to FIG. 5A, the pixel circuit may operate including at least one bias period Tobs1 and Tobs2 during the refresh period.

At least one bias period Tobs1 and Tobs2 is a period in which an on-bias stress operation (OBS) to apply a bias voltage Vobs is performed, the emission control signal EM(n) is a high voltage, and the third and fourth transistors T3 and T4 may operate to be off. The first scan signal SC1(n)

and the fourth scan signal SC4(n) are low voltages and the first transistor T1 and the seventh transistor T7 may operate to be off. The second scan signal SC2(n) is a low voltage and the second transistor T2 may operate to be off.

The third scan signal SC3(n) is input as a low voltage and the fifth and sixth transistors T5 and T6 may be turned on. As the fifth transistor T5 is turned on, the bias voltage Vobs may be applied to the first electrode of the driving transistor DT connected to the second node N2.

Here, the bias voltage Vobs is supplied to the third node N3 which is a drain electrode of the driving transistor DT so that a charging time or charging delay of the voltage of the fifth node N5 which is the anode electrode of the light emitting diode ED in the emission period may be reduced. The driving transistor DT maintains a stronger saturation state.

For example, the higher the bias voltage Vobs, the higher the voltage of the third node N3 which is the drain electrode of the driving transistor DT and the lower the gate-source voltage or the drain-source voltage of the driving transistor DT. Accordingly, the bias voltage Vobs may be higher than at least the data voltage Vdata.

At this time, the magnitude of the drain-source current which passes through the driving transistor DT may be reduced and in a positive bias stress situation, the stress of the driving transistor DT is reduced to solve the charging delay of the voltage of the third node N3. For example, before sampling a threshold voltage (Vth) of the driving transistor DT, the on-bias stress operation (OBS) may be performed to relieve the hysteresis of the driving transistor DT.

Accordingly, in at least one bias period Tobs1 and Tobs2, the on-bias stress operation (OBS) may be referred to as an operation of directly applying an appropriate bias voltage to the driving transistor DT during non-emission periods.

Further, in at least one bias period Tobs1 and Tobs2, the sixth transistor T6 is turned on so that the anode electrode (or the pixel electrode) of the light emitting diode ED connected to the fifth node N5 may be initialized with the first initialization voltage Var.

The gate electrodes of the fifth and sixth transistors T5 and T6 may be configured to receive separate scan signals to be independently controlled. For example, it is not required to necessarily simultaneously apply the bias voltage to the first electrode of the driving transistor DT and the anode electrode of the light emitting diode ED in the bias period.

Referring to FIG. 5A, the pixel circuit may operate including the initialization period Ti during the refresh period. The initialization period Ti may be a period in which the voltage of the gate electrode of the driving transistor DT is initialized.

The first scan signal SC1(n), the third scan signal SC3(n), and the fourth scan signal SC4(n) and the emission control signal EM(n) are high voltages, the second scan signal SC2(n) is a low voltage, and the first transistor T1 and the seventh transistor T7 may operate to be turned on. The second to sixth transistors T2, T3, T4, T5, and T6 may operate to be turned off. As the first and seventh transistors T1 and T7 are turned on, the gate electrode of the driving transistor DT and the second electrode connected to the first node N1 may be initialized with the second initialization voltage Vini.

Referring to FIG. 5A, the pixel circuit may operate including a sampling period Ts during the refresh period. The sampling period may be a period in which the threshold voltage (Vth) of the driving transistor DT is sampled.

The first scan signal SC1(n), the second scan signal SC2(n), the third scan signal SC3(n) and the emission control signal EM(n) are high voltages and the fourth scan signal SC4(n) may be input as a low voltage. Accordingly, the third to seventh transistors T3, T4, T5, T6, and T7 may operate to be turned off, the first transistor T1 may maintain an on-state, and the second transistor T2 may operate to be turned on. For example, the second transistor T2 is turned on to apply the data voltage Vdata to the driving transistor DT and the first transistor T1 is diode-connected between the first node N1 and the third node N3 to sample the threshold voltage (Vth) of the driving transistor DT.

Referring to FIG. 5A, the pixel circuit may operate including an emission period Te during the refresh period. The emission period Te may be a period in which the sampled threshold voltage (Vth) is cancelled and the driving current corresponding to the sampled data voltage allows the light emitting diode ED to emit light.

The emission control signal EM(n) is a low voltage and the third and fourth transistors T3 and T4 may operate to be turned on.

As the third transistor T3 operates to be turned on, the high potential driving voltage EVDD connected to the fourth node N4 may be applied to the first electrode of the driving transistor DT connected to the second node N2 through the third transistor T3. The driving current which is supplied from the driving transistor DT to the light emitting diode ED via the fourth transistor T4 becomes independent of the value of the threshold voltage (Vth) of the driving transistor DT so that the threshold voltage (Vth) of the driving transistor DT may be compensated for operation.

Next, the driving of the pixel circuit and the light emitting diode during the hold period will be described with reference to FIG. 5B.

The hold period may include at least one bias period Tobs3 and Tobs4 and an emission period Te'. Description of an operation of the pixel circuit which is the same as the operation of the refresh period will be omitted. For example, at least one bias period Tobs3 and Tobs4 and the emission period Te' are substantially the same as at least one bias period Tobs1 and Tobs2 and the emission period Te so that a description will be omitted.

As described above, in the refresh period, a new data voltage Vdata is charged to apply a new data voltage Vdata to the gate electrode of the driving transistor DT, and in the hold period, the data voltage Vdata of the refresh period is held to be used as it is. Accordingly, the hold period may not require the initialization period T1 and the sampling period Ts, unlike the refresh period.

In the operation of the hold period, a single on-bias stress operation (OBS) may be sufficient. However, in the exemplary embodiment, for the convenience of the driving circuit, the third scan signal SC3(n) of the hold period is driven as the same as the third scan signal SC3(n) of the refresh period so that the on-bias stress operation (OBS) may operate twice as in the refresh period, but the exemplary embodiments of the present disclosure are not limited thereto.

The difference between the driving signal in the refresh period which has been described with reference to FIG. 5A and the driving signal of the hold period in FIG. 5B is the second and fourth scan signals SC2(n) and SC4(n). In the hold period, the initialization period T1 and the sampling period Ts are not necessary so that unlike the refresh period, the second scan signal SC2(n) may be always a low voltage and the fourth scan signal SC4(n) may be always a low voltage. For example, the second and seventh transistors T2 and T7 may operate to be always turned off.

Figure 6:
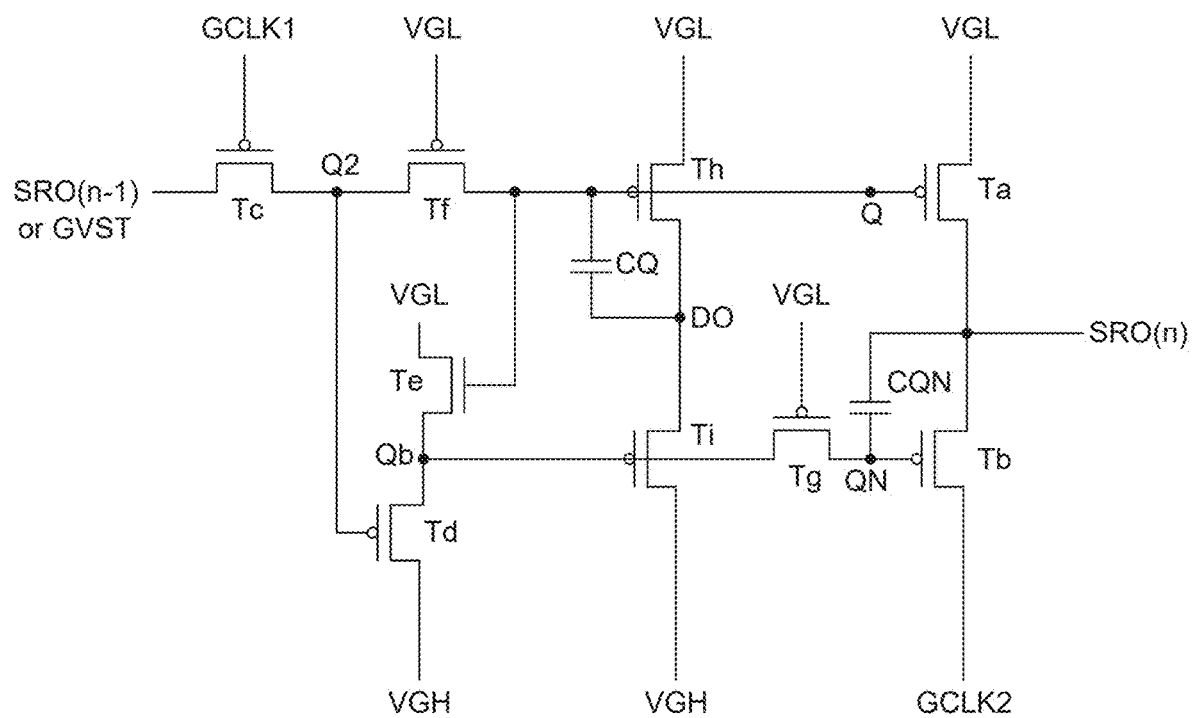
FIG. 6 is a circuit diagram of a stage of a gate driver of a display apparatus according to an exemplary embodiment of the present disclosure.

FIG. 6 is a circuit diagram of a stage of a gate driver of a display apparatus according to an exemplary embodiment of the present disclosure.

For example, in FIG. 6, a circuit of a fourth scan driver 324 included in each of the plurality of stages of a gate driver is illustrated. A circuit configuration of another emission control signal driver 310 and scan drivers 321, 322, and 323 included in each of the plurality of stages is also substantially the same as the fourth scan driver 324.

Each of the plurality of fourth scan drivers of the gate driver of the display apparatus according to an exemplary embodiment of the present disclosure may include first to ninth transistors Ta to Ti and first and second capacitors CON and CQ.

In a first transistor Ta, a first electrode may be connected to a gate low voltage (VGL) supply line, a gate electrode may be connected to a Q node Q, and a second electrode may be connected to a scan signal output terminal. Therefore, the first transistor Ta is turned on/off according to a voltage of the Q node Q to output a gate low voltage VGL as a scan signal SRO(n). For example, the first transistor Ta may be connected between the gate low voltage (VGL) supply line and the scan signal output terminal.

In the second transistor Tb, a first electrode may be connected to a second clock signal (GCLK2) supply line, a gate electrode may be connected to a QN node QN, and a second electrode may be connected to the scan signal output terminal. The second transistor Tb is turned on/off according to a voltage of the QN node QN to output the second clock signal GCLK2 as the scan signal SRO(n). For example, the second transistor Tb may be connected between the second clock signal (GCLK2) supply line and the scan signal output terminal.

In a third transistor Tc, a first electrode may be connected to an input terminal of a start signal (GVST) or an output terminal of a previous stage scan signal SRO(n−1), a gate electrode may be connected to a first clock signal (GCLK1) supply line, and a second electrode may be connected to a Q2 node Q2. Therefore, the third transistor Tc is turned on/off according to the first clock signal GCLK1 to apply a start signal GVST or a pervious stage scan signal SRO(n−1) to the Q2 node Q2. For example, the third transistor Tc may be connected between an input terminal of the start signal GVST or an output terminal of the previous stage scan signal SRO(n−1) and the Q2 node Q2. In a fourth transistor Td, a first electrode may be connected to a gate high voltage (VGH) supply line, a gate electrode may be connected to a Q2 node Q2, and a second electrode may be connected to a Qb node Qb. Therefore, the fourth transistor Td is turned on/off according to a voltage of the Q2 node Q2 to supply a gate high voltage VGH to the Qb node Qb. For example, the fourth transistor Td may be connected between the gate high voltage (VGH) supply line and the Qb node Qb.

In a fifth transistor Te, a first electrode may be connected to a gate low voltage (VGL) supply line, a gate electrode may be connected to a Q node Q, and a second electrode may be connected to a Qb node Qb. Therefore, the fifth transistor Te is turned on/off according to a voltage of the Q node Q to supply a gate low voltage VGL to the Qb node Qb. For example, the fifth transistor Te may be connected between the gate low voltage (VGL) supply line and the Qb node Qb.

In a sixth transistor Tf, a first electrode may be connected to the Q2 node Q2, a gate electrode may be connected to the gate low voltage (VGL) supply line, and a second electrode may be connected to the Q node Q. Therefore, the sixth transistor Tf is turned on/off according to the gate low voltage VGL to connect the Q2 node Q2 and the Q node Q. For example, the sixth transistor Tf may be connected between the Q2 node Q2 and the Q node Q. In a seventh transistor Tg, a first electrode may be connected to the Qb node Qb, a gate electrode may be connected to the gate low voltage (VGL) supply line, and a second electrode may be connected to the QN node QN. Therefore, the seventh transistor Tg is turned on/off according to the gate low voltage VGL to connect the Qb node Qb and the QN node QN. For example, the seventh transistor Tg may be connected between the Qb node Qb and the QN node QN.

In an eighth transistor Th, a first electrode may be connected to a gate low voltage (VGL) supply line, a gate electrode may be connected to a Q node Q, and a second electrode may be connected to a dummy signal output terminal DO. Therefore, the eighth transistor Th is turned on/off according to a voltage of the Q node Q to output a gate low voltage VGL to the dummy signal output terminal DO. For example, the eighth transistor Th may be connected between the gate low voltage (VGL) supply line and the dummy signal output terminal DO.

In a ninth transistor T1, a first electrode may be connected to a gate high voltage (VGH) supply line, a gate electrode may be connected to a Qb node Qb, and a second electrode may be connected to the dummy signal output terminal DO. The ninth transistor T1 is turned on/off according to a voltage of the Qb node Qb to output a gate high voltage VGH to the dummy signal output terminal DO. For example, the ninth transistor Ti may be connected between the gate high voltage (VGH) supply line and the dummy signal output terminal DO.

The fifth transistor Te may be an N-type thin film transistor and the other transistors Ta, Tb, Tc, Td, Tf, Tg, Th, and Ti may be P-type thin film transistors.

Further, the N-type thin film transistor may be an oxide thin film transistor and the P-type thin film transistor may be a polycrystalline silicon thin film transistor.

Accordingly, the fifth transistor Te is applied with the high voltage to operate to be turned on and the other transistors Ta, Tb, Tc, Td, Tf, Tg, Th, and Ti are applied with the low voltage to operate to be turned on.

The first capacitor CON is connected between the gate electrode and the second electrode of the second transistor Tb to bootstrap the QN node QN.

The second capacitor CQ is connected between the gate electrode and the second electrode of the eighth transistor Th to bootstrap the Q node Q.

The first transistor Ta, the second transistor Tb, and the first capacitor CON which are connected to the scan signal output terminal of each of the plurality of fourth scan drivers 324, are directly associated with the output of the scan signal SRO(n). Therefore, the first transistor Ta, the second transistor Tb, and the first capacitor CON may be referred to as scan signal output units.

The eighth transistor Th, the ninth transistor Ti, and the second capacitor CQ connected to the dummy signal output terminal DO of each of the plurality of fourth scan drivers 324 are directly associated with the output of the dummy signal so that the eighth transistor Th, the ninth transistor Ti, and the second capacitor CQ may be referred to as a dummy signal output unit.

The third to seventh transistors Tc to Tg are components related to the control of the Q node, QN node, Q2 node, and the Qb node so that the third to seventh transistors Tc to Tg may be referred to as a node controller.

An operation of each of the plurality of fourth scan drivers 324 which is configured as described above will be described with reference to FIGS. 7 to 8D as follows.

Figure 7:
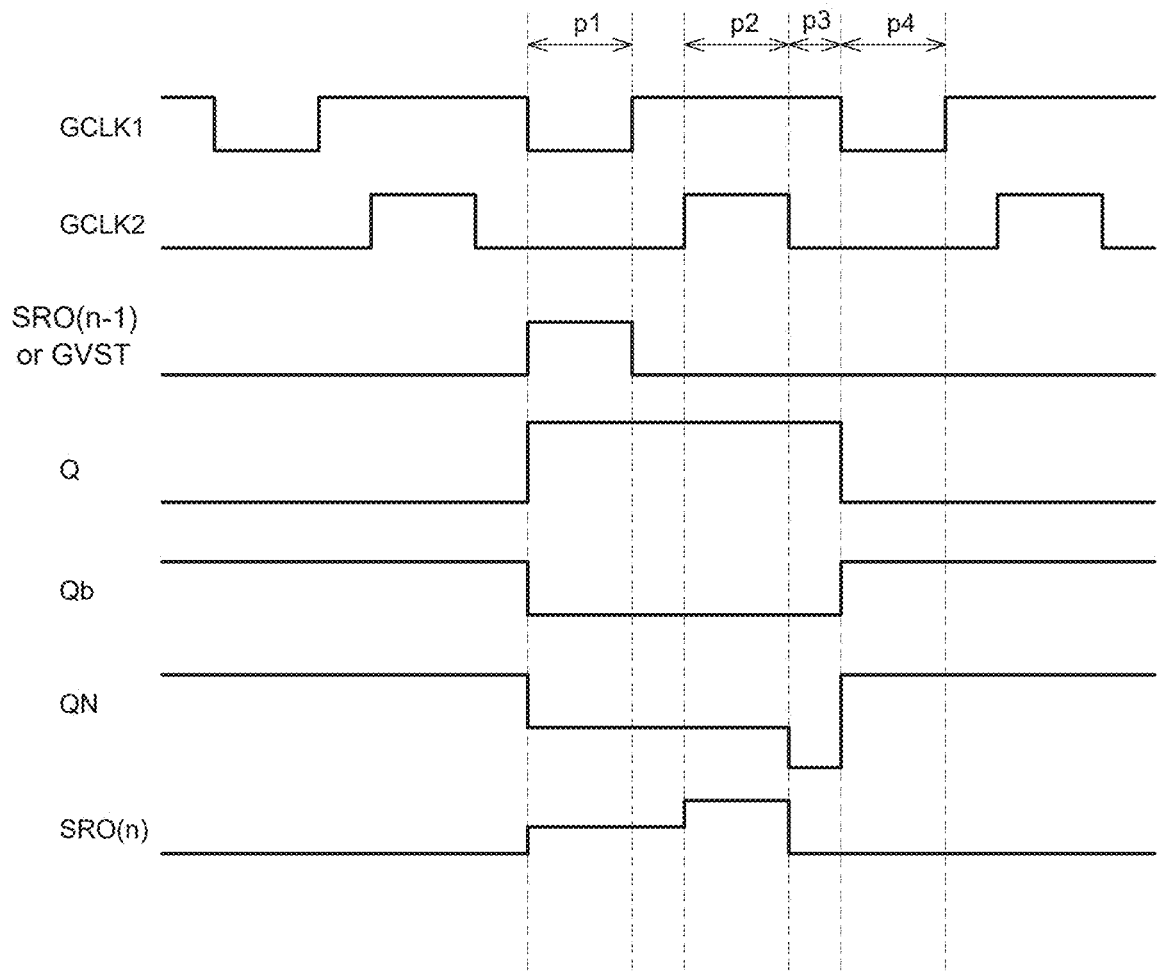
FIG. 7 is a waveform illustrating signals which are input and output to and from a plurality of stages of a gate driver of a display apparatus according to an exemplary embodiment of the present disclosure.

FIG. 7 is a waveform illustrating signals which are input and output to and from a plurality of stages of a gate driver of a display apparatus according to an exemplary embodiment of the present disclosure.

Figure 8A:
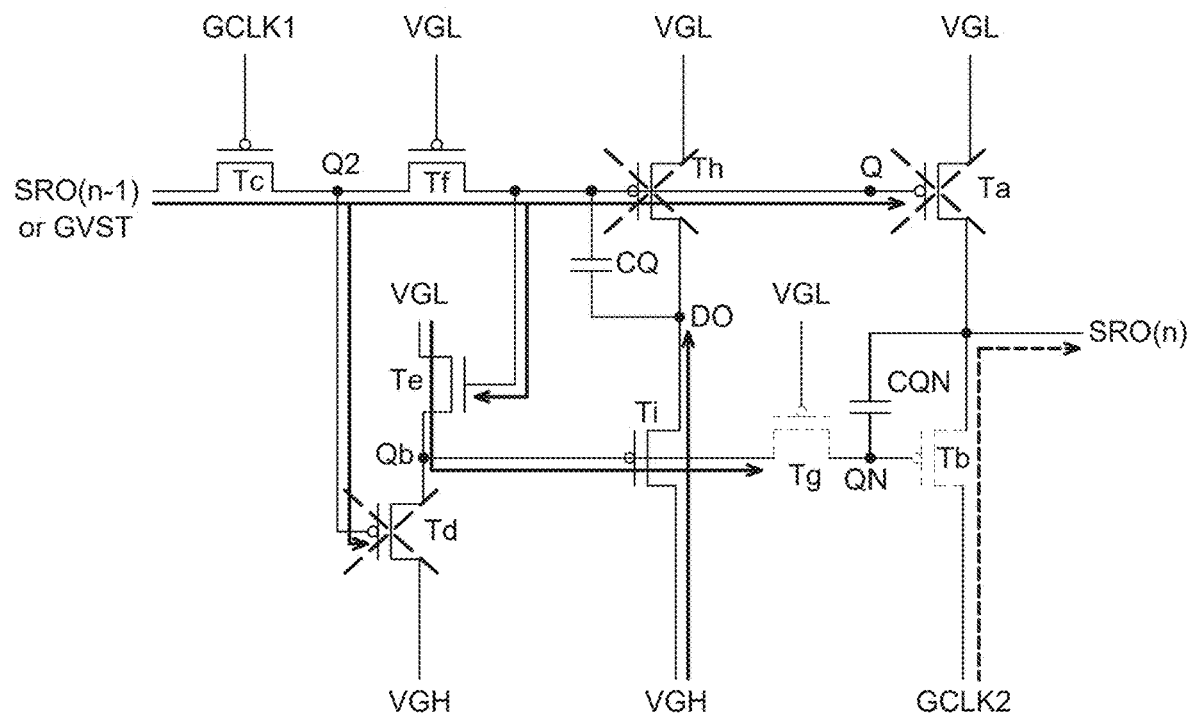
FIG. 8A is a circuit diagram explaining an operation of a plurality of stages of a gate driver of a display apparatus in a first period according to an exemplary embodiment of the present disclosure.

FIG. 8A is a circuit diagram explaining an operation of a plurality of stages of a gate driver of a display apparatus in a first period according to an exemplary embodiment of the present disclosure.

Figure 8B:
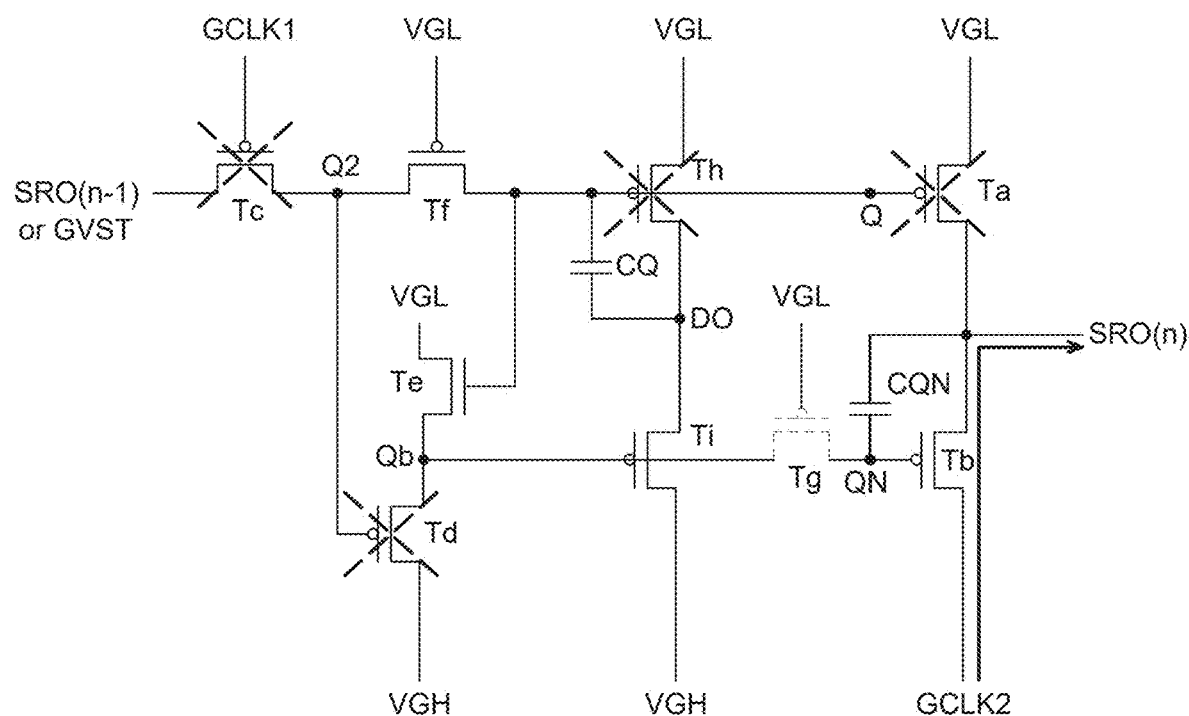
FIG. 8B is a circuit diagram explaining an operation of a plurality of stages of a gate driver of a display apparatus in a second period according to an exemplary embodiment of the present disclosure.

FIG. 8B is a circuit diagram explaining an operation of a plurality of stages of a gate driver of a display apparatus in a second period according to an exemplary embodiment of the present disclosure.

Figure 8C:
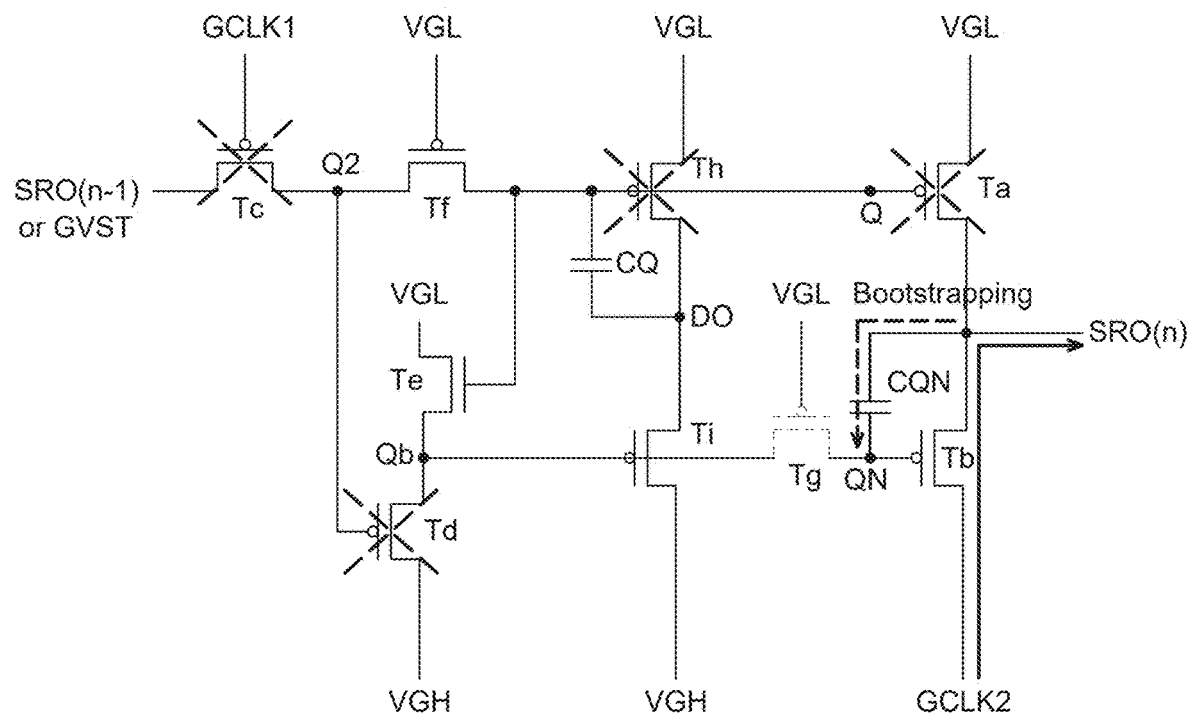
FIG. 8C is a circuit diagram explaining an operation of a plurality of stages of a gate driver of a display apparatus in a third period according to an exemplary embodiment of the present disclosure.

FIG. 8C is a circuit diagram explaining the operation of a plurality of stages of a gate driver of a display apparatus in a third period according to an exemplary embodiment of the present disclosure.

Figure 8D:
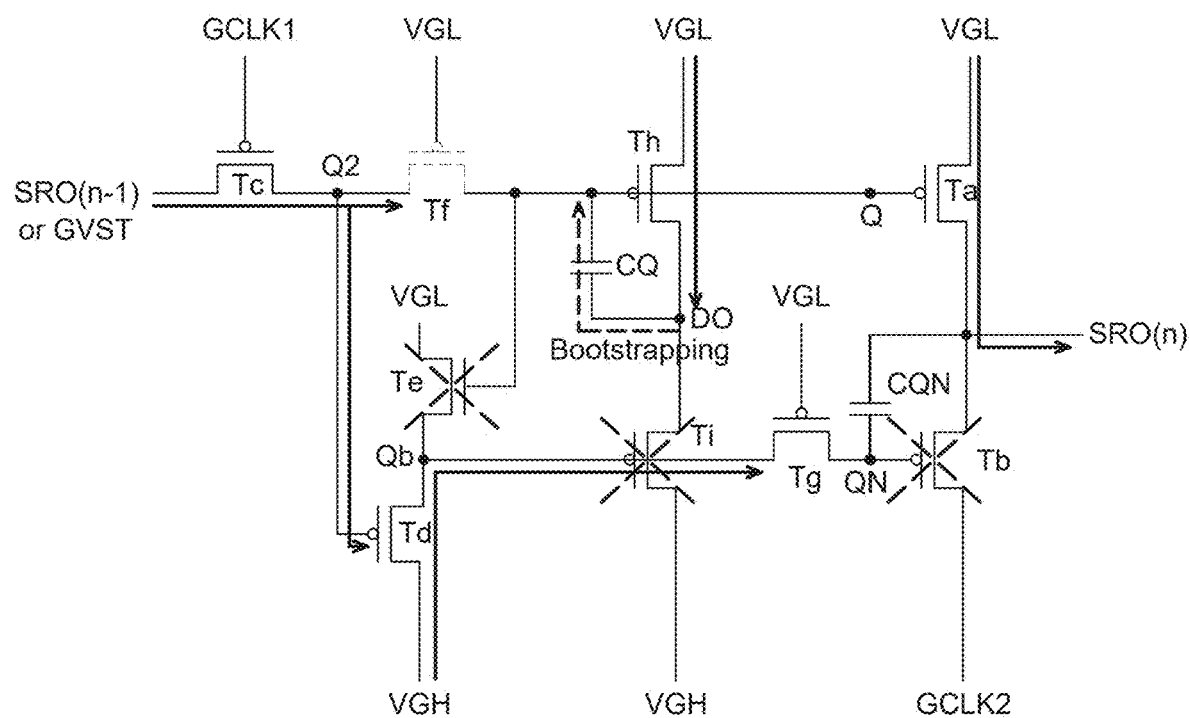
FIG. 8D is a circuit diagram explaining an operation of a plurality of stages of a gate driver of a display apparatus in a fourth period according to an exemplary embodiment of the present disclosure.

FIG. 8D is a circuit diagram explaining the operation of a plurality of stages of a gate driver of a display apparatus in a fourth period according to an exemplary embodiment of the present disclosure.

In FIGS. 8A to 8D, a transistor denoted with a solid line may be a transistor which is completely turned on and a transistor denoted with a dotted line may be a transistor which is incompletely turned on. When the transistor is incompletely turned on, even though the turn-on voltage is applied to the gate electrode to turn on the transistor, due to the voltage change of the source electrode, the gate-source voltage (Vgs) becomes a threshold voltage or lower to be turned off.

As illustrated in FIGS. 7 and 8A, in the first period p1, the first clock signal GCLK1 is input at a low level so that the third transistor Tc may be turned on. Therefore, a high level of start signal GVST or a previous stage scan signal SRO (n−1) may be input to the Q2 node Q2.

The gate low voltage VGL is applied to the gate electrode of the sixth transistor Tf to completely turn on the sixth transistor Tf so that a high level of start signal GVST or the previous stage scan signal SRO(n−1) may be input also to the Q node Q.

Therefore, the high level of start signal GVST or the previous stage scan signal SRO(n−1) is input also to the Q node Q to turn on the fifth transistor Te so that the gate low voltage VGL may be applied to the Qb node Qb.

The gate low voltage VGL is applied to the Qb node Qb to completely turn on the ninth transistor Ti so that the gate high voltage VGH may be applied to the dummy signal output terminal DO.

The gate low voltage VGL is applied to the gate electrode of the seventh transistor Tg to turn on the seventh transistor Tg for the moment, but when the gate-source voltage (Vgs) of the seventh transistor Tg becomes the threshold voltage, the seventh transistor Tg may be turned off.

Accordingly, a voltage corresponding to the sum of the gate low voltage VGL and the threshold voltage of the seventh transistor Tg may be charged in the QN node QN.

Therefore, the voltage corresponding to the sum of the gate low voltage VGL and the threshold voltage of the seventh transistor Tg may be applied to the gate electrode of the second transistor Tb and the low level of second clock signal GCLK2 may be applied to the second electrode of the second transistor Tb. Therefore, the second transistor Tb may be incompletely turned on.

For example, the second transistor Tb is turned on only until the gate-source voltage (Vgs) of the second transistor Tb becomes the threshold voltage. Therefore, the second transistor Tb cannot output the low level of second clock signal GCLK2 as the scan signal SRO(n), but may output a higher level of voltage than the low level of second clock signal GCLK2 as the scan signal SRO(n).

For example, as the scan signal SRO(n), a voltage corresponding to a sum of a threshold voltage of the seventh transistor Tg and a threshold voltage of the second transistor Tb may be charged in the low level of the second clock signal GCLK2.

As illustrated in FIGS. 7 and 8B, in a second period p2 after the first period p1, the second clock signal GCLK2 may rise from the low level to the high level.

Therefore, the voltage corresponding to the sum of the gate low voltage VGL and the threshold voltage of the seventh transistor Tg is applied to the gate electrode of the second transistor Tb and the high level of second clock signal GCLK2 is applied to the second electrode of the second transistor Tb. Therefore, the second transistor Tb may be completely turned on.

Therefore, the second transistor Tb outputs the high level of second clock signal GCLK2 as the scan signal SRO(n).

In the second period p2, the first clock signal GCLK1 may rise from the low level to the high level. Therefore, the third transistor Tc may be turned off.

As illustrated in FIGS. 7 and 8C, in a third period p3 after the second period p2, the second clock signal GCLK2 may fall from the high level to the low level.

For example, in the third period p3, when a voltage which is lower than a sum of the gate low voltage VGL and the threshold voltage is applied to the QN node QN, the seventh transistor Tg is turned off to float the QN node QN. The floated QN node QN is bootstrapped by the first capacitor CON to maintain a voltage which is lower than the gate low voltage VGL.

Therefore, the second transistor Tb is completely turned on to output the low level of second clock signal GCLK2 as the scan signal SRO(n).

As illustrated in FIGS. 7 and 8D, in the fourth period p4 after the third period p3, the first clock signal GCLK1 is input at a low level so that the third transistor Tc is turned on. Therefore, a low level of start signal GVST or a previous stage scan signal SRO(n−1) may be input to the Q2 node Q2.

The gate low voltage VGL is applied to the gate electrode of the sixth transistor Tf so that the sixth transistor Tf may be incompletely turned on. Therefore, the gate low voltage VGL is applied to the gate electrode of the sixth transistor Tf to turn on the sixth transistor Tf for the moment, but when the gate-source voltage (Vgs) of the sixth transistor Tf becomes the threshold voltage, the sixth transistor Tf may be turned off.

When a voltage lower than a sum of the gate low voltage VGL and the threshold voltage is applied to the Q node Q, the sixth transistor Tf is turned off to float the Q node Q. The floated Q node Q is bootstrapped by the second capacitor CQ to maintain a voltage which is lower than the gate low voltage VGL.

Therefore, the eighth transistor Th is completely turned on to output a gate low voltage VGL to the dummy signal output terminal DO.

Further, the first transistor Ta is also completely turned on to output a gate low voltage VGL as the scan signal SRO(n).

The low level of start signal GVST or the previous stage scan signal SRO(n−1) is input to the Q2 node Q2 to turn on the fourth transistor Td so that the gate high voltage VGH may be applied to the Qb node Qb.

The gate high voltage VGH is applied to the Qb node Qb so that the ninth transistor Ti may be completely turned off.

The gate low voltage VGL is applied to the gate electrode of the seventh transistor Tg to completely turn on the seventh transistor Tg to apply the gate high voltage VGH also to the QN node QN. Therefore, the second transistor Tb may be turned off.

In the display apparatus according to the exemplary embodiment of the present disclosure, the scan signal output unit may be configured using the first transistor Ta and the second transistor Tb which are P-type transistors.

The P-type transistor has a high mobility so that in the second period p2 and the third period p3, the rising time and the falling time of the scan signal SRO(n) may be minimized. Consequently, the response speed of the display apparatus according to the exemplary embodiment of the present disclosure may be improved.

According to the present disclosure, the P-type transistor can use a small channel area so that an area of the gate driver may be minimized. Accordingly, in the display apparatus according to the exemplary embodiment of the present disclosure, an area occupied by the gate driver is minimized to reduce a bezel size of the display apparatus.

In another exemplary embodiment of the present disclosure, it is described adding a tenth transistor.

The above-described exemplary embodiment of the present disclosure and the another exemplary embodiment are different from each other only in a configuration of the tenth transistor and an operation using the same so that a redundant description for the repeated configurations of the first to ninth transistors will be omitted.

Figure 9:
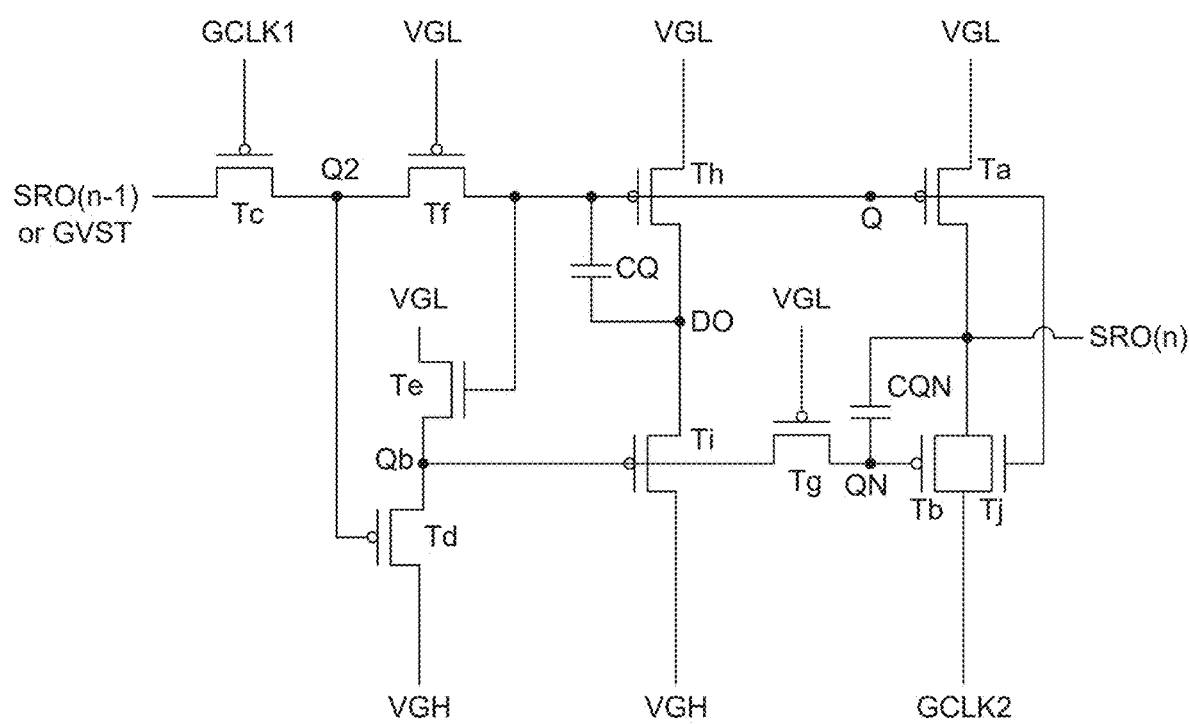
FIG. 9 is a circuit diagram of a stage of a gate driver of a display apparatus according to another exemplary embodiment of the present disclosure.

FIG. 9 is a circuit diagram of a stage of a gate driver of a display apparatus according to another exemplary embodiment of the present disclosure.

Each of a plurality of fourth scan drivers of the gate driver of the display apparatus according to another exemplary embodiment of the present disclosure may include first to tenth transistors Ta to Tj and first and second capacitors CON and CQ.

The redundant description for the configurations of the first to ninth transistors Ta to Ti and the first and second capacitors CON and CQ which are the same as those of the above exemplary embodiment of the present disclosure will be omitted.

In the tenth transistor Tj, a first electrode may be connected to a second clock signal (GCLK2) supply line, a gate electrode may be connected to a Q node Q, and a second electrode may be connected to the scan signal output terminal. The tenth transistor Tj is turned on/off according to a voltage of the Q node Q to output the second clock signal GCLK2 as the scan signal SRO(n). For example, the tenth transistor Tj may be connected between the second clock signal (GCLK2) supply line and the scan signal output terminal.

The tenth transistor Tj may be an N-type thin film transistor and the N-type thin film transistor may be an oxide thin film transistor. Therefore, a high voltage is applied to the tenth transistor Tj to operate to be turned on.

The first transistor Ta, the second transistor Tb, the tenth transistor Tj, and the first capacitor CQN which are connected to the scan signal output terminals are directly associated with the output of the scan signal SRO(n). Therefore, the first transistor Ta, the second transistor Tb, the tenth transistor Tj, and the first capacitor CQN may be referred to as scan signal output units.

An operation of each of the plurality of fourth scan drivers which is configured as described above will be described with reference to FIGS. 10 to 11D as follows.

Figure 10:
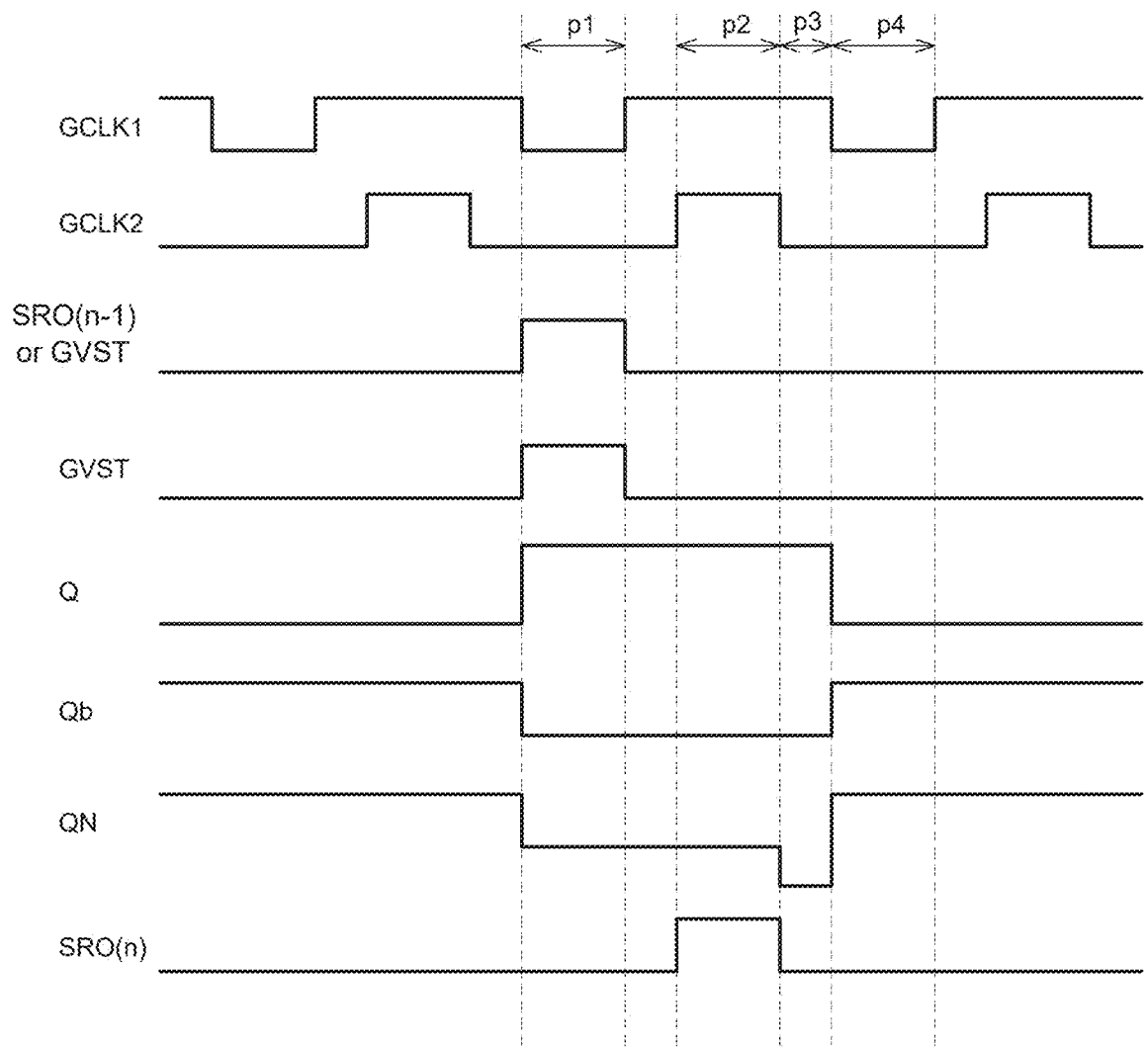
FIG. 10 is a waveform illustrating signals which are input and output to and from a plurality of stages of a gate driver of a display apparatus according to another exemplary embodiment of the present disclosure.

FIG. 10 is a waveform illustrating signals which are input and output to and from a plurality of stages of a gate driver of a display apparatus according to another exemplary embodiment of the present disclosure.

Figure 11A:
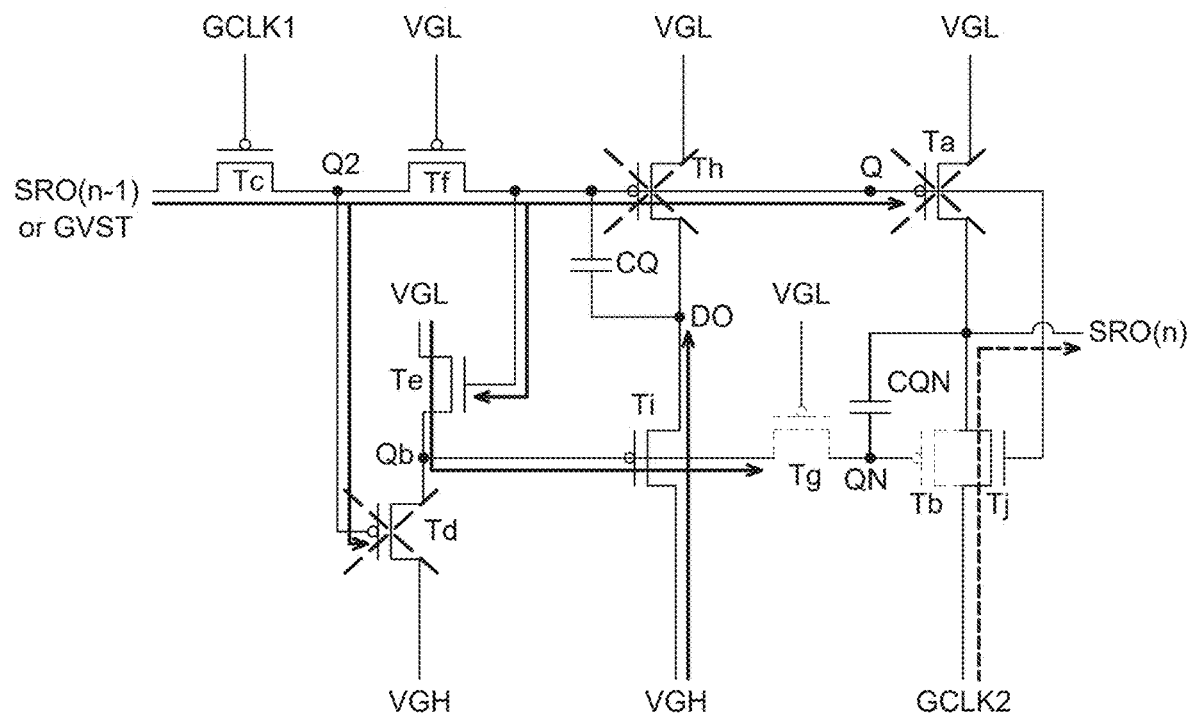
FIG. 11A is a circuit diagram explaining an operation of a plurality of stages of a gate driver of a display apparatus in a fourth period according to another exemplary embodiment of the present disclosure.

FIG. 11A is a circuit diagram explaining an operation of a plurality of stages of a gate driver of a display apparatus in a first period according to another exemplary embodiment of the present disclosure.

Figure 11B:
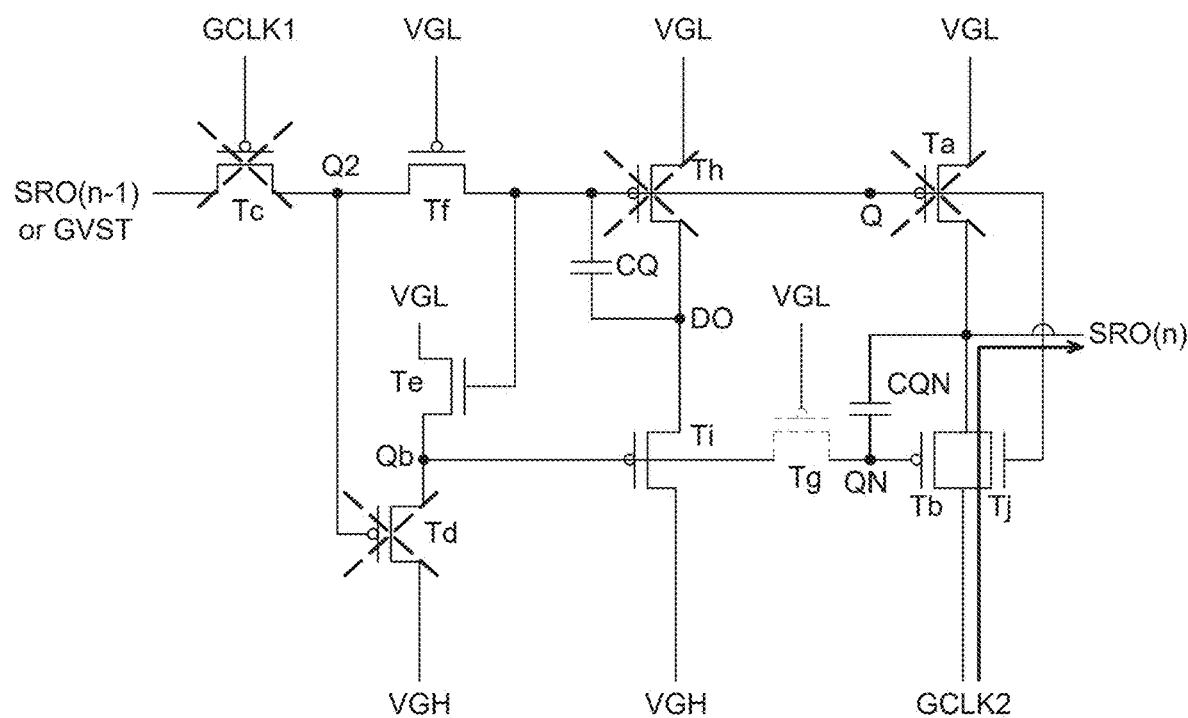
FIG. 11B is a circuit diagram explaining an operation of a plurality of stages of a gate driver of a display apparatus in a second period according to another exemplary embodiment of the present disclosure.

FIG. 11B is a circuit diagram explaining an operation of a plurality of stages of a gate driver of a display apparatus in a second period according to another exemplary embodiment of the present disclosure.

Figure 11C:
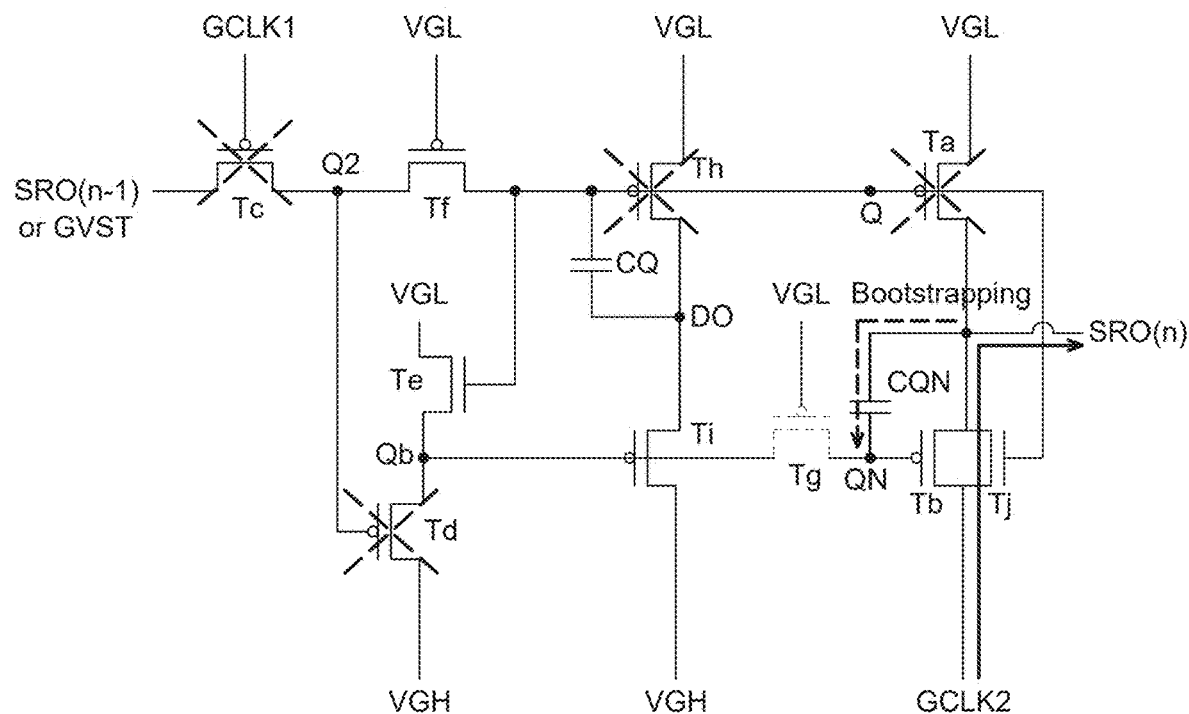
FIG. 11C is a circuit diagram explaining an operation of a plurality of stages of a gate driver of a display apparatus in a third period according to another exemplary embodiment of the present disclosure.

FIG. 11C is a circuit diagram explaining an operation of a plurality of stages of a gate driver of a display apparatus in a third period according to another exemplary embodiment of the present disclosure.

Figure 11D:
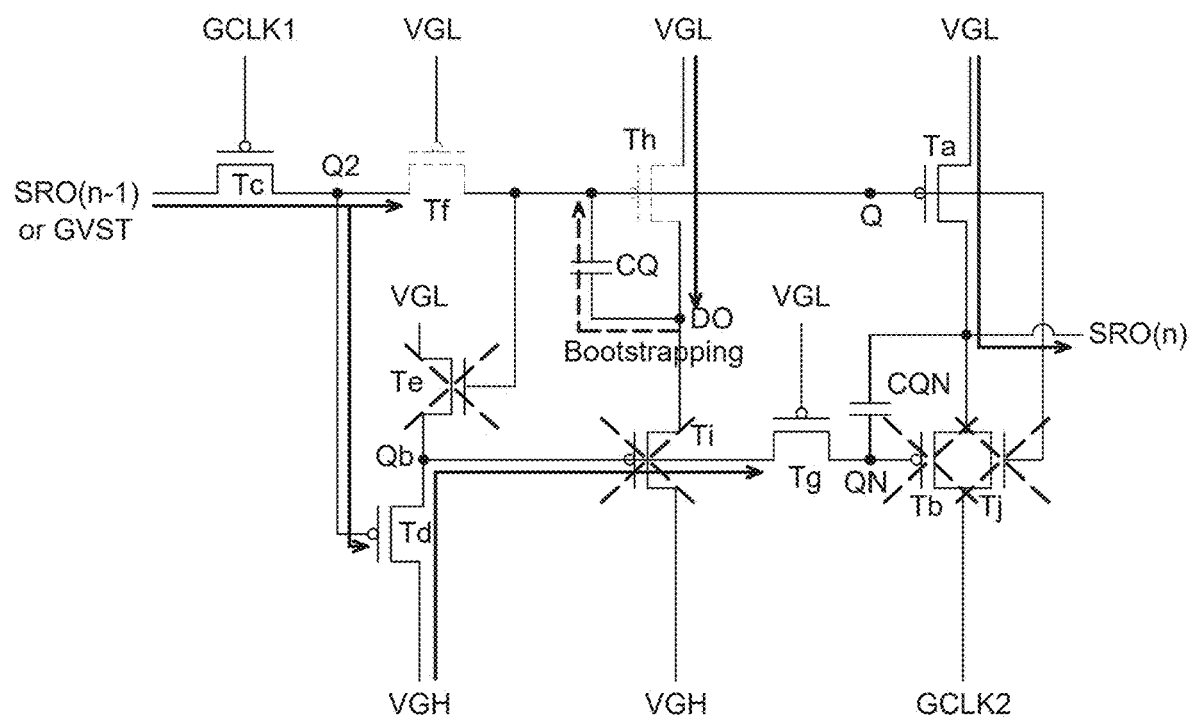
FIG. 11D is a circuit diagram explaining an operation of a plurality of stages of a gate driver of a display apparatus in a fourth period according to another exemplary embodiment of the present disclosure.

FIG. 11D is a circuit diagram explaining an operation of a plurality of stages of a gate driver of a display apparatus in a fourth period according to another exemplary embodiment of the present disclosure.

In FIGS. 11A and 11D, a transistor denoted with a solid line may be a transistor which is completely turned on and a transistor denoted with a dotted line may be a transistor which is incompletely turned on. When the transistor is incompletely turned on, even though the turn-on voltage is applied to the gate electrode to turn on the transistor, due to the voltage change of the source electrode, the gate-source voltage (Vgs) becomes a threshold voltage or lower to be turned off.

As illustrated in FIGS. 10 and 11A, in the first period p1, the first clock signal GCLK1 is input as a low level so that the third transistor Tc may be turned on. Therefore, a high level of start signal GVST or a previous stage scan signal SRO(n−1) may be input to the Q2 node Q2.

The gate low voltage VGL is applied to the gate electrode of the sixth transistor Tf to completely turn on the sixth transistor Tf so that a high level of start signal GVST or the previous stage scan signal SRO(n−1) may be input also to the Q node Q.

Therefore, the high level of start signal GVST or the previous stage scan signal SRO(n−1) is input also to the Q node Q to turn on the fifth transistor Te so that the gate low voltage VGL may be applied to the Qb node Qb.

The gate low voltage VGL is applied to the Qb node Qb to completely turn on the ninth transistor Ti so that the gate high voltage VGH may be applied to the dummy signal output terminal DO.

The gate low voltage VGL is applied to the gate electrode of the seventh transistor Tg to turn on the seventh transistor Tg for the moment, but when the gate-source voltage (Vgs) of the seventh transistor Tg becomes the threshold voltage, the seventh transistor Tg may be turned off.

Accordingly, a voltage corresponding to the sum of the gate low voltage VGL and the threshold voltage of the seventh transistor Tg may be charged in the QN node QN.

Therefore, the voltage corresponding to the sum of the gate low voltage VGL and the threshold voltage of the seventh transistor Tg is applied to the gate electrode of the second transistor Tb and the low level of second clock signal GCLK2 is applied to the second electrode of the second transistor Tb. Therefore, the second transistor Tb may be incompletely turned on.

A high level of start signal GVST or a previous stage scan signal SRO(n−1) are input to the Q node Q so that the tenth transistor Tj is completely turned on. Therefore, the tenth transistor Tj may output the low level of second clock signal GCLK2 as the scan signal SRO(n). As illustrated in FIGS. 10 and 11B, in a second period p2 after the first period p1, the second clock signal GCLK2 may rise from the low level to the high level.

Therefore, the voltage corresponding to the sum of the gate low voltage VGL and the threshold voltage of the seventh transistor Tg is applied to the gate electrode of the second transistor Tb and the high level of second clock signal GCLK2 is applied to the second electrode of the second transistor Tb. Therefore, the second transistor Tb may be completely turned on.

Therefore, the second transistor Tb may output the high level of second clock signal GCLK2 as the scan signal SRO(n).

In the second period p2, the first clock signal GCLK1 may rise from the low level to the high level. Therefore, the third transistor Tc may be turned off.

As illustrated in FIGS. 10 and 11C, in a third period p3 after the second period p2, the second clock signal GCLK2 may fall from the high level to the low level.

For example, in the third period p3, when a voltage which is lower than a sum of the gate low voltage VGL and the threshold voltage is applied to the QN node QN, the seventh transistor Tg is turned off to float the QN node QN. The floated QN node QN is bootstrapped by the first capacitor CON to maintain a voltage which is lower than the gate low voltage VGL.

Therefore, the second transistor Tb is completely turned on to output the low level of second clock signal GCLK2 as the scan signal SRO(n).

As illustrated in FIGS. 10 and 11D, in the fourth period p4 after the third period p3, the first clock signal GCLK1 is input at a low level so that the third transistor Tc may be turned on. Therefore, a low level of start signal GVST or a previous stage scan signal SRO(n−1) may be input to the Q2 node Q2.

The gate low voltage VGL is applied to the gate electrode of the sixth transistor Tf so that the sixth transistor Tf may be incompletely turned on. Therefore, the gate low voltage VGL is applied to the gate electrode of the sixth transistor Tf to turn on the sixth transistor Tf for the moment, but when the gate-source voltage (Vgs) of the sixth transistor Tf becomes the threshold voltage, the sixth transistor Tf may be turned off.

When a voltage lower than a sum of the gate low voltage VGL and the threshold voltage is applied to the Q node Q, the sixth transistor Tf is turned off to float the Q node Q. The floated Q node Q is bootstrapped by the second capacitor CQ to maintain a voltage which is lower than the gate low voltage VGL.

Therefore, the eighth transistor Th is completely turned on to output a gate low voltage VGL to the dummy signal output terminal DO.

Further, the first transistor Ta is also completely turned on to output a gate low voltage VGL as the scan signal SRO(n).

Therefore, the tenth transistor Tj may be turned off.

The low level of start signal GVST or the previous stage scan signal SRO(n−1) is input to the Q2 node Q2 to turn on the fourth transistor Td so that the gate high voltage VGH may be applied to the Qb node Qb.

The gate high voltage VGH is applied to the Qb node Qb so that the ninth transistor T1 may be completely turned off.

The gate low voltage VGL is applied to the gate electrode of the seventh transistor Tg to completely turn on the seventh transistor Tg to apply the gate high voltage VGH also to the QN node QN. Therefore, the second transistor Tb may be turned off.

In another exemplary embodiment of the present disclosure, the P-type second transistor Tb and the N-type tenth transistor Tj may configure a transmission gate which is connected between the scan signal output terminal and the second clock signal supply line in parallel.

In the first period p1 of the display apparatus according to another exemplary embodiment of the present disclosure, the second transistor Tb is incompletely turned on, but the tenth transistor Tj may be completely turned on.

For example, the transmission gate configured by the second transistor Tb and the tenth transistor Tj is completely turned on in the first period p1 to output a complete low level of scan signal SRO(n).

Therefore, in another exemplary embodiment of the present disclosure, in all the periods except the second period p2, a complete low level is output to suppress a positive bias temperature stress of the gate driver so that the driving reliability may be improved.

The display apparatus according to another exemplary embodiment of the present disclosure may solve a problem in that the complete low level of scan signal SRO(n) cannot be output in the first period p1 to cause a screen defect in a predetermined period.

According to the present disclosure, the tenth transistor configured to output the complete low level of scan signal SRO(n) in the first period p1 is added to output the complete low level of scan signal SRO(n) in the first period p1.

Hereinafter, still another exemplary embodiment of the present disclosure will be described with reference to FIG. 12.

Still another exemplary embodiment of the present disclosure and another exemplary embodiment are different only in a configuration of a third capacitor so that a redundant description for a configuration and an operating method of the first to tenth transistors will be omitted.

Figure 12:
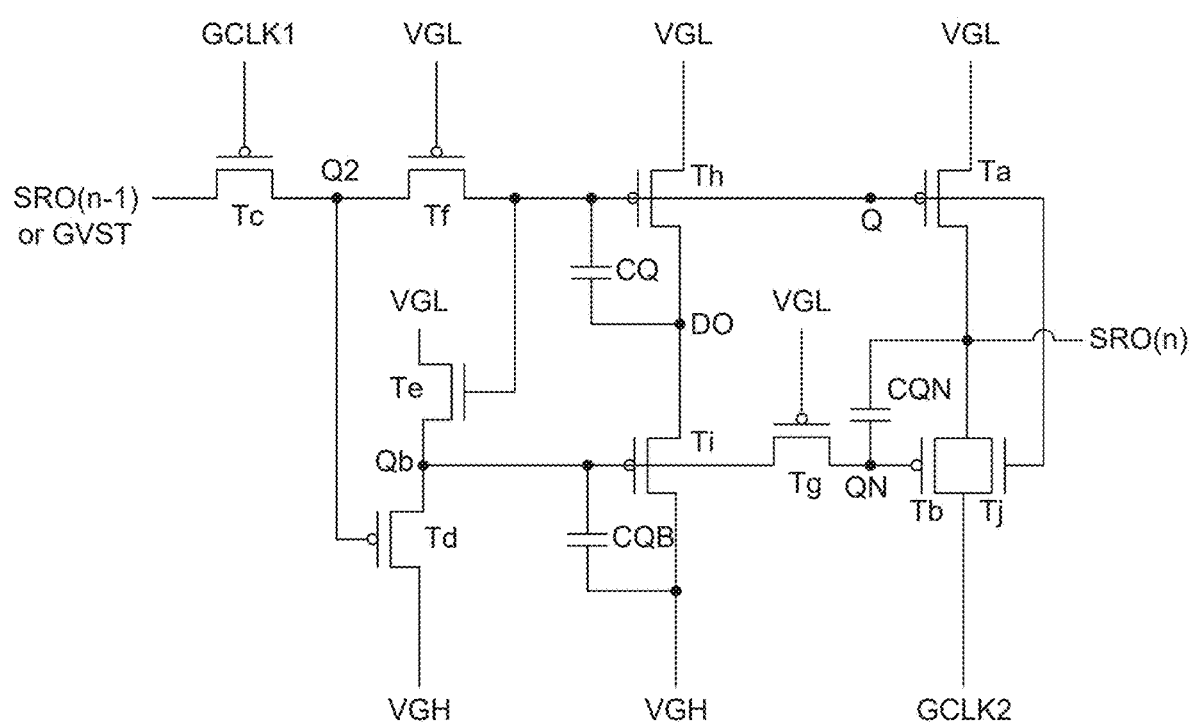
FIG. 12 is a circuit diagram of a stage of a gate driver of a display apparatus according to still another exemplary embodiment of the present disclosure.

FIG. 12 is a circuit diagram of a stage of a gate driver of a display apparatus according to still another exemplary embodiment of the present disclosure.

Each of a plurality of fourth scan drivers of the gate driver of the display apparatus according to still another exemplary embodiment of the present disclosure may include first to tenth transistors Ta to Tj and first to third capacitors CQN, CQ, CQB.

The redundant description for the configurations of the first to tenth transistors Ta to Tj and the first and second capacitors CON and CQ which are substantially the same as those of another exemplary embodiment of the present disclosure will be omitted.

The third capacitor CQB may be connected between the Qb node Qb and a gate high voltage (VGH) supply line. Therefore, the third capacitor CQB is connected between a node which is a constant power source and the gate high voltage (VGH) supply line to minimize a noise of the Qb node Qb.

Therefore, a voltage fluctuation of the Qb node Qb of the gate driver according to still another exemplary embodiment of the present disclosure is minimized to improve the driving stability of the gate driver.

The exemplary embodiments of the present disclosure can also be described as follows:

According to an aspect of the present disclosure, a gate driver includes a plurality of stages, each of the plurality of stages includes: a node controller configured to control voltages of a Q node, a Q2 node, a Qb node, and a QN connected to transistors node based on a first clock signal and a second clock signal; a dummy signal output unit configured to output a dummy signal based on the voltages of the Q node and the Qb node; and a scan signal output unit configured to output a scan signal to a scan line based on the voltages of the Q node and the QN node, and a transistor configured to output a gate low voltage according to a voltage of the Q node as the scan signal, among a configuration of the scan signal output unit, may be a P-type transistor.

The scan signal output unit may include a first transistor which is connected between a gate low voltage supply line and a scan signal output terminal; a second transistor connected between a second clock signal supply line and the scan signal output terminal; and a first capacitor connected between a gate electrode and a second electrode of the second transistor.

The first transistor may be configured to output the gate low voltage as the scan signal according to the voltage of the Q node, and the second transistor may be configured to output the second clock signal as the scan signal according to the voltage of the QN node.

Each of the first transistor and the second transistor may be a P-type transistor.

The P-type transistor may be a polycrystalline silicon transistor.

The node controller may include a third transistor connected between a start signal input terminal or a scan signal output terminal of a previous stage and the Q2 node; a fourth transistor connected between a gate high voltage supply line and the Qb node; a fifth transistor connected between a gate low voltage supply line and the Qb node; a sixth transistor connected between the Q2 node and the Q node; and a seventh transistor connected between the Qb node and the QN node.

The fifth transistor may be an N-type oxide transistor and each of the third transistor, the fourth transistor, the sixth transistor, and the seventh transistor may be a P-type polycrystalline silicon transistor.

The node controller may be connected between the Qb node and the gate high voltage supply line.

The dummy signal output unit may include an eighth transistor which is connected between a gate low voltage supply line and a dummy signal output terminal; a ninth transistor which is connected between a gate high voltage supply line and the dummy signal output terminal; and a second capacitor connected between a gate electrode and a second electrode of the eighth transistor.

Each of the eighth transistor and the ninth transistor may be a P-type polycrystalline silicon transistor.

The dummy signal output unit may further include a third capacitor connected between the Qb node and the gate high voltage supply line.

The scan signal output unit may further include a tenth transistor which is connected between the second clock signal supply line and the scan signal output terminal.

The tenth transistor may be an N-type oxide transistor.

According to an embodiment of the present disclosure, a display apparatus includes a display panel including an active area in which a plurality of pixels is disposed; and a gate driver including a plurality of stages, each of the plurality of stages includes: a node controller configured to control voltages of a Q node, a Q2 node, a Qb node, and a QN node connected to transistors based on a first clock signal and a second clock signal; a dummy signal output unit configured to output a dummy signal based on the voltages of the Q node and the Qb node; and a scan signal output unit configured to output a scan signal to a scan line based on the voltages of the Q node and the QN node, and a transistor configured to output a gate low voltage according to a voltage of the Q node as the scan signal, among a configuration of the scan signal output unit, may be a P-type transistor.

The scan signal output unit may include a first transistor which is connected between a gate low voltage supply line and a scan signal output terminal; a second transistor connected between a second clock signal supply line and the scan signal output terminal; and a first capacitor which is connected between a gate electrode and a second electrode of the second transistor.

The first transistor may be configured to output the gate low voltage as the scan signal according to the voltage of the Q node, and the second transistor may be configured to output the second clock signal as the scan signal according to the voltage of the QN node.

Each of the first transistor and the second transistor may be a P-type transistor.

The P-type transistor may be a polycrystalline silicon transistor.

The node controller may include a third transistor connected between a start signal input terminal or a scan signal output terminal of a previous stage and the Q2 node; a fourth transistor connected between a gate high voltage supply line and the Qb node; a fifth transistor connected between a gate low voltage supply line and the Qb node; a sixth transistor connected between the Q2 node and the Q node; and a seventh transistor connected between the Qb node and the QN node.

The fifth transistor may be an N-type oxide transistor and each of the third transistor, the fourth transistor, the sixth transistor, and the seventh transistor may be a P-type polycrystalline silicon transistor.

The node controller may be connected between the Qb node and the gate high voltage supply line.

The dummy signal output unit may include an eighth transistor which is connected between a gate low voltage supply line and a dummy signal output terminal; a ninth transistor which is connected between a gate high voltage supply line and the dummy signal output terminal; and a second capacitor which is connected between a gate electrode and a second electrode of the eighth transistor.

Each of the eighth transistor and the ninth transistor may be a P-type polycrystalline silicon transistor.

The dummy signal output unit may further include a third capacitor connected between the Qb node and the gate high voltage supply line.

Each of the plurality of pixels may include one of a P-type transistor and an N-type transistor or a combination thereof.

The scan signal output unit further may include a tenth transistor which is connected between the second clock signal supply line and the scan signal output terminal.

The tenth transistor may be an N-type oxide transistor.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. All the technical concepts in the equivalent scope of the present disclosure should be construed as falling within the scope of the present disclosure.

What is claimed is:

1. A gate driver, comprising: a plurality of stages, each of the plurality of stages including:
    a node controller configured to control voltages of a Q node, a Q2 node, a Qb node, and a QN node that are directly connected to transistors included in the node controller based on a first clock signal and a second clock signal;
    a dummy signal output circuit configured to output a dummy signal based on the voltages of the Q node and the Qb node; and
    a scan signal output circuit configured to output a scan signal to a scan line based on the voltages of the Q node and the QN node, wherein the Q node is directly connected to a gate electrode of a first transistor of the scan signal output circuit, and to a gate electrode of an eighth transistor of the dummy signal output circuit, and
    a transistor configured to output a gate low voltage, according to the voltage of the Q node, as the scan signal among a configuration of the scan signal output circuit, wherein the transistor is a P-type transistor.

2. The gate driver according to claim 1, wherein the scan signal output circuit includes:
    the first transistor that is connected to a gate low voltage supply line and a scan signal output terminal;
    a second transistor that is connected to a second clock signal supply line and the scan signal output terminal; and
    a first capacitor connected to a gate electrode and a second electrode of the second transistor.

3. The gate driver according to claim 2, wherein the first transistor is configured to output the gate low voltage as the scan signal according to the voltage of the Q node, and the second transistor is configured to output the second clock signal as the scan signal according to the voltage of the QN node.

4. The gate driver according to claim 2, wherein each of the first transistor and the second transistor is a P-type transistor.

5. The gate driver according to claim 4, wherein the P-type transistor is a polycrystalline silicon transistor.

6. The gate driver according to claim 1, wherein the node controller includes:
    a third transistor connected to a start signal input terminal or a scan signal output terminal of a previous stage and the Q2 node;
    a fourth transistor connected to a gate high voltage supply line and the Qb node;
    a fifth transistor connected to a gate low voltage supply line and the Qb node;
    a sixth transistor connected to the Q2 node and the Q node; and
    a seventh transistor connected to the Qb node and the QN node.

7. The gate driver according to claim 6, wherein the fifth transistor is an N-type oxide transistor and each of the third transistor, the fourth transistor, the sixth transistor, and the seventh transistor is a P-type polycrystalline silicon transistor.

8. The gate driver according to claim 1, wherein the dummy signal output circuit includes:
    the eighth transistor that is connected to a gate low voltage supply line and a dummy signal output terminal;
    a ninth transistor that is connected to a gate high voltage supply line and the dummy signal output terminal; and
    a second capacitor that is connected to a gate electrode and a second electrode of the eighth transistor.

9. The gate driver according to claim 8, wherein each of the eighth transistor and the ninth transistor is a P-type polycrystalline silicon transistor.

10. The gate driver according to claim 8, further including:
    a third capacitor that is connected to the Qb node and the gate high voltage supply line.

11. The gate driver according to claim 2, wherein the scan signal output circuit further includes:
    a tenth transistor that is connected to the second clock signal supply line and the scan signal output terminal.

12. The gate driver according to claim 11, wherein the tenth transistor is an N-type oxide transistor.

13. A display apparatus, comprising:
    a display panel including an active area in which a plurality of pixels is disposed; and
    the gate driver according to claim 1.

14. The display apparatus according to claim 13, wherein each of the plurality of pixels includes one of a P-type transistor and an N-type transistor or a combination thereof.

* * * * *